(12) United States Patent
Kobayashi et al.

(10) Patent No.: US 6,894,410 B2
(45) Date of Patent: May 17, 2005

(54) THIN BRUSHLESS MOTOR HAVING RING-CONFIGURED CENTRALIZED POWER DISTRIBUTION UNIT

(75) Inventors: Makoto Kobayashi, Yokkaichi (JP); Izumi Suzuki, Yokkaichi (JP); Tatsuro Horie, Wako (JP); Kenji Fukuda, Wako (JP)

(73) Assignees: Sumitomo Wiring Systems, Ltd., Mie (JP); Honda Giken Kogyo Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/281,202

(22) Filed: Oct. 28, 2002

(65) Prior Publication Data

US 2003/0173842 A1 Sep. 18, 2003

(30) Foreign Application Priority Data

Oct. 26, 2001 (JP) ........................................ 2001-330026

(51) Int. Cl.$^7$ ........................ H01R 33/20; H01R 43/02; H02K 11/00; H05K 3/34
(52) U.S. Cl. ........................ 310/71; 310/64; 310/68 R; 310/239
(58) Field of Search .............................. 310/43, 51, 54, 310/64, 68 B, 68 D, 71, 179, 239, 249, 254

(56) References Cited

U.S. PATENT DOCUMENTS

| | | | |
|---|---|---|---|
| 4,153,812 A | 5/1979 | Persson ..................... | 373/103 |
| 4,593,464 A * | 6/1986 | Williams et al. ............. | 29/879 |
| 4,689,023 A * | 8/1987 | Strong et al. ............... | 439/189 |
| 4,720,646 A | 1/1988 | Torimoto .................... | 310/71 |
| 4,845,396 A | 7/1989 | Huber ....................... | 310/239 |
| 5,006,741 A | 4/1991 | Schott ...................... | 310/68 D |
| 5,006,765 A | 4/1991 | Schmider .................... | 310/71 |
| 5,491,370 A | 2/1996 | Schneider et al. ............ | 310/54 |
| 5,821,663 A | 10/1998 | Kiehnle et al. .............. | 310/249 |
| 5,825,109 A | 10/1998 | Jeske ....................... | 310/71 |
| 5,828,147 A * | 10/1998 | Best et al. ................. | 310/71 |
| 5,900,687 A * | 5/1999 | Kondo et al. ................ | 310/71 |
| 5,949,174 A | 9/1999 | Moss et al. ................. | 310/233 |
| 6,030,260 A | 2/2000 | Kikuchi et al. .............. | 439/890 |
| 6,084,324 A | 7/2000 | Jeske ....................... | 310/71 |
| 6,124,655 A | 9/2000 | Jeske ....................... | 310/71 |
| 6,208,056 B1 | 3/2001 | Perkins ..................... | 310/179 |
| 6,275,404 B1 | 8/2001 | Shichijyo et al. ............ | 363/145 |
| 6,300,697 B1 | 10/2001 | Findeisen et al. ............ | 310/68 B |

(Continued)

FOREIGN PATENT DOCUMENTS

| | | |
|---|---|---|
| JP | A 2000-197311 | 7/2000 |
| JP | A 2002-186233 | 6/2002 |
| JP | A-2002-186234 | 6/2002 |
| JP | A-2002-223552 | 8/2002 |

OTHER PUBLICATIONS

U.S. Appl. No. 10/816,934, filed Apr. 2004, Makota et al.
U.S. Appl. No. 10/281,115, filed Oct. 28, 2002, Makota et al.

*Primary Examiner*—Darren Schuberg
*Assistant Examiner*—Pedro J. Cuevas
(74) *Attorney, Agent, or Firm*—Oliff & Berridge, PLC

(57) ABSTRACT

A centralized power distribution unit for a vehicular thin brushless motor includes a plurality of bus bars and a resin insulating layer that covers the bus bars. The bus bars are disposed correspondingly with phases of the motor. Each of the bus bars has a terminal portion to be connected to a battery and one or more tabs to be connected respectively to one or more windings of a stator. Each of the bus bars is shaped into a substantially annular shape by bending a molded material in a thickness direction. The molded material is obtained by stamping out a conductive metal plate into a strip-like shape. Diameters of the annular shapes of the bus bars are set to be different from one another depending on the corresponding phase of the motor. The bus bars are stacked in a radial direction of the centralized power distribution unit, mutually separated by a predetermined gap.

4 Claims, 28 Drawing Sheets

U.S. PATENT DOCUMENTS

| | | | |
|---|---|---|---|
| 6,362,554 B1 | 3/2002 | Neal | 310/254 |
| 6,369,473 B1 * | 4/2002 | Baumeister et al. | 310/71 |
| 6,426,690 B1 | 7/2002 | Takenoshita | 335/220 |
| 6,437,464 B1 | 8/2002 | Neal | 310/43 |
| 6,445,097 B1 | 9/2002 | Zeiler et al. | 310/71 |
| 6,566,779 B2 * | 5/2003 | Takano et al. | 310/214 |
| 6,570,280 B2 * | 5/2003 | Takahashi | 310/71 |
| 6,577,029 B1 * | 6/2003 | Weber et al. | 310/68 R |
| 6,600,244 B2 * | 7/2003 | Okazaki et al. | 310/71 |
| 6,617,719 B2 | 9/2003 | Sunage et al. | 310/64 |
| 6,617,721 B1 | 9/2003 | Neal | 310/68 D |
| 6,653,754 B2 | 11/2003 | Uchida et al. | 310/51 |
| 6,664,678 B2 | 12/2003 | Schimizu | 310/71 |
| 6,674,195 B2 * | 1/2004 | Yagyu et al. | 310/71 |
| 6,737,773 B2 * | 5/2004 | Hayashi et al. | 310/71 |
| 6,768,243 B1 * | 7/2004 | Yamazaki et al. | 310/239 |
| 2003/0090166 A1 | 5/2003 | Kobayashi et al. | 310/71 |
| 2003/0094879 A1 | 5/2003 | Kobayashi et al. | 310/71 |
| 2003/0173841 A1 | 9/2003 | Kobayashi et al. | |

* cited by examiner

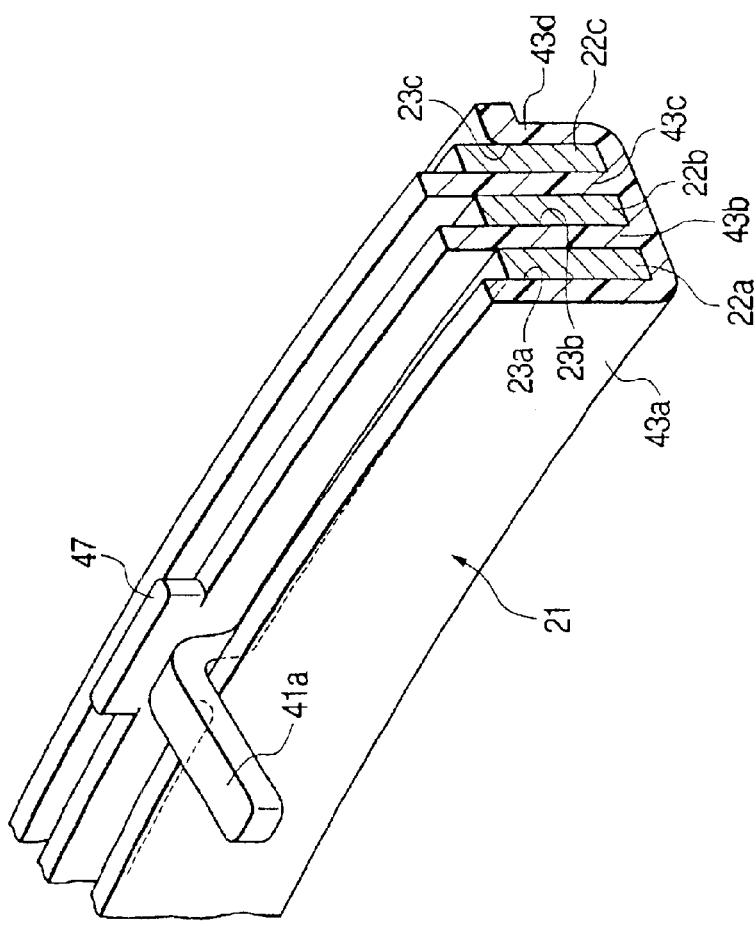
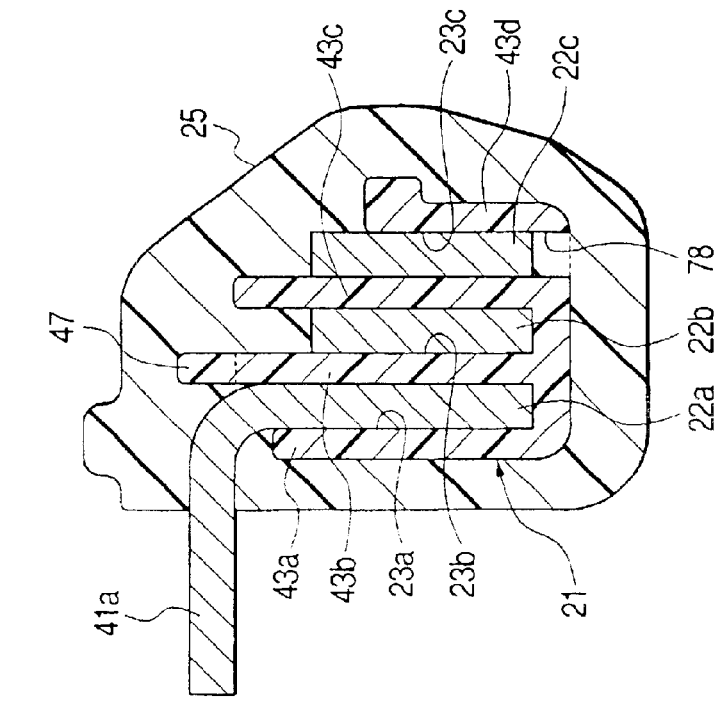
FIG. 14A
FIG. 14B

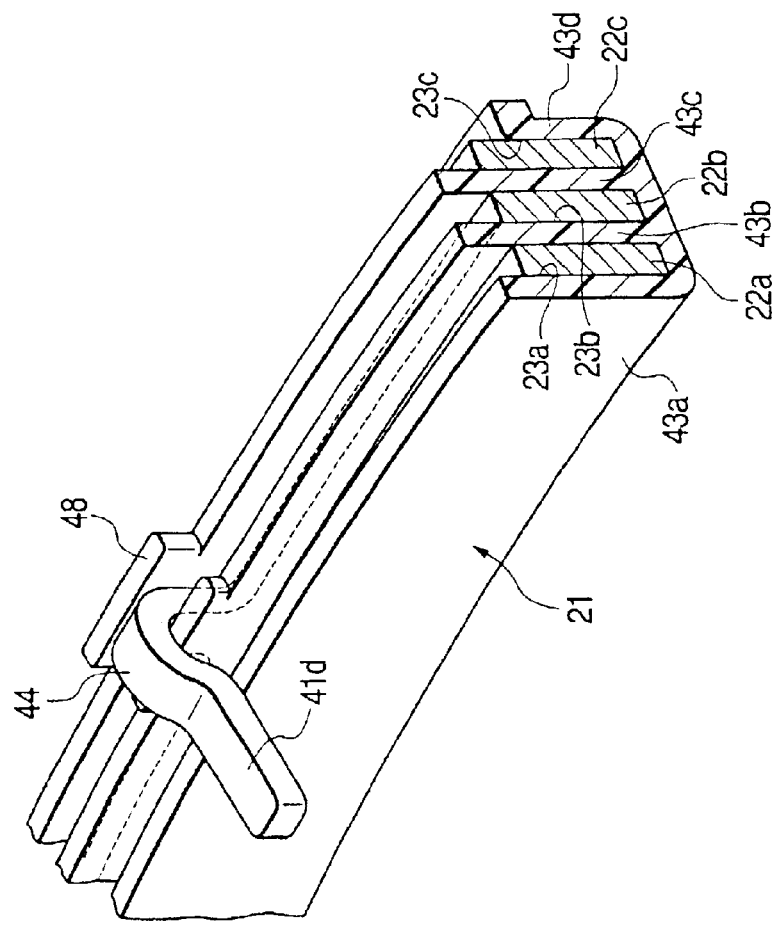
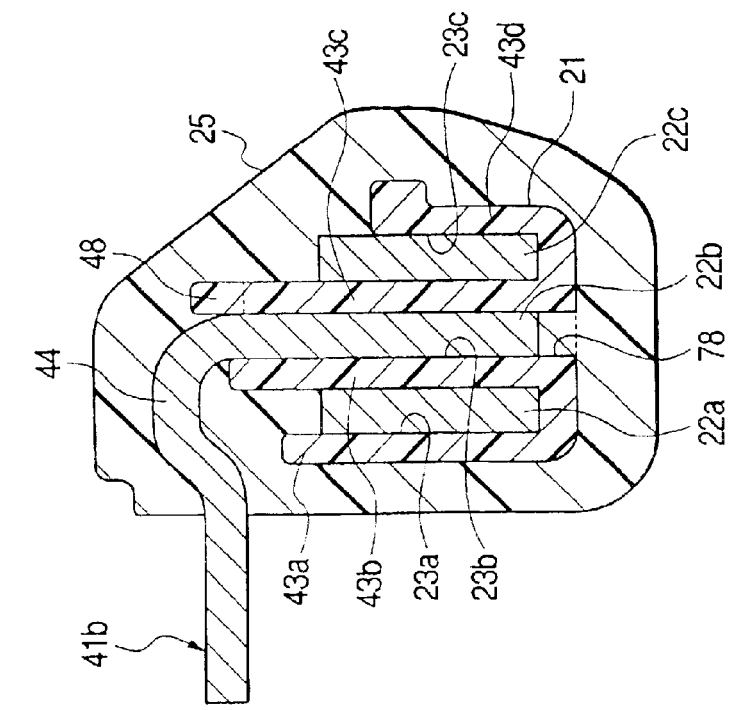

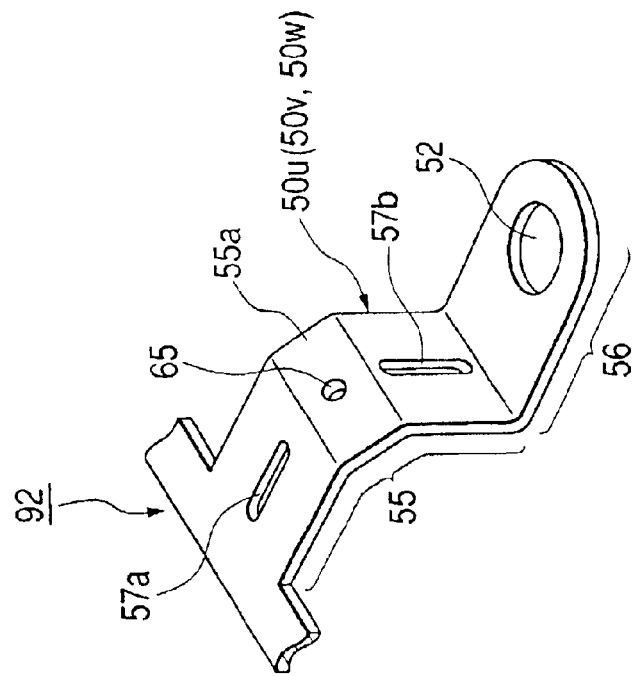

THIN BRUSHLESS MOTOR HAVING RING-CONFIGURED CENTRALIZED POWER DISTRIBUTION UNIT

RELATED APPLICATIONS

Cross-reference is made to the following co-pending, commonly assigned U.S. Application Publication No. US-2003-0090166-A1, U.S. Application Publication No. US-2003-0094879-A1, U.S. Application Publication No. US-2003-0173841-A1, and U.S. application Ser. No. 10/916,934.

BACKGROUND OF THE INVENTION

1. Field of Invention

The present invention relates to a centralized power distribution unit which is used for performing centralized power distribution on stator windings of a vehicular thin brushless motor.

2. Description of Related Art

Recently, automobiles with good fuel economy have been in high demand. As one example of automobile manufacturers' efforts to meet these demands, hybrid cars with super low fuel consumption have been developed. In particular, a hybrid car has been proposed recently which is provided with an auxiliary power mechanism (a motor assist mechanism) in which an engine provides the main power and a DC brushless motor assists the engine upon acceleration or the like.

The motor assist mechanism is subject to much constraint in installation, since a brushless motor constituting the motor assist mechanism is disposed in a limited space, for example, a space between an engine and a transmission in an engine compartment. Thus, such a brushless motor is required to have a thin configuration.

A thin brushless motor to be used in the motor assist mechanism of a vehicle includes a rotor directly connected to a crankshaft of the engine, and a ring-like stator enclosing the rotor. The stator includes many magnetic poles that have windings on cores, a stator holder that contains the magnetic poles, and a centralized distribution unit that concentratedly distributes currents to the windings.

As shown in FIG. 34A, a conventional centralized power distribution unit used in a three-phase DC brushless motor includes three ring-like bus bars 101, 102, and 103. Each of the ring-like bus bars 101, 102, and 103 includes a ring-like body 104, a terminal portion 105 projecting outwardly in a radial direction on an outer periphery of the ring-like body 104, and a plurality of tabs 106 each projecting inwardly in the radial direction on an inner periphery of the ring-like body 104. Each terminal portion 105 is electrically connected through an electric wire to a battery while each tab 106 is electrically connected through a respective electric wire to an end of a respective winding. When the three ring-like bus bars 101, 102, and 103 are energized, currents are concentratedly distributed to the windings corresponding to a U phase, a V phase, and a W phase. Consequently, the motor is driven.

SUMMARY OF THE INVENTION

When the conventional centralized power distribution unit is to be produced, press moldings must be conducted on a conductive metal plate 107 using different molds to form ring-like bus bars 101, 102, and 103 for the three phases as shown in FIG. 34B.

In order to obtain the ring-like bus bars 101, 102, and 103, the conductive metal plate 107 must have a size which is at least as larger than the outer diameters of the bus bars 101, 102, and 103. Most of the portions of the metal plate other than the portions which are stamped out into the ring-like shape become wasted. Therefore, conventionally, as seen from the above, the conductive metal plate 107 includes a very large useless portion and hence is wasteful. This is a cause of increased production costs of a centralized power distribution unit.

The invention has been made in view of the above-discussed problem. It is an object of the invention to provide a centralized power distribution unit for a vehicular thin brushless motor which can be produced at a small amount of waste of a metal material and at a low cost. It is another object of the invention to provide a method of producing bus bars which are preferably used as excellent components of the centralized power distribution unit.

In order to attain these objects, in the invention, a centralized power distribution unit for a vehicular thin brushless motor includes: a plurality of bus bars each having a terminal portion to be connected to a battery, and tabs to be respectively connected to windings of a stator, the bus bars being disposed correspondingly with phases of the motor; and a resin insulating layer that covers the bus bars. The centralized power distribution unit can intensively distribute a current to the windings, and has a ring-like shape. Each of the bus bars is shaped into a substantially annular shape by bending a molded material which is obtained by stamping out a conductive metal plate into a strip-like shape. In a thickness direction, diameters of the bus bars are set to be different from one another depending on the phase, and the bus bars are stacked in a radial direction of the centralized power distribution unit, being separated from one another by a predetermined gap.

According to the invention, therefore, the bus bars can be configured by materials which are stamped out into a strip-like shape, so that it is not required to use a considerably large conductive metal plate and the bus bars can be obtained with a reduced amount of wasted material. In the case of a strip-like shape, the bus bars can be obtained in a state where the bus bars are densely placed, and hence the amount of wasted material can be reduced. Therefore, the material cost of the bus bars can be reduced, with the result that the centralized power distribution unit can be produced at a low cost.

In the invention, in a method of producing bus bars used in a centralized power distribution unit of the above-mentioned invention, press molding using a mold is conducted to simultaneously stamp out the bus bars respectively corresponding to the phases from a common conductive metal plate.

According to the invention, therefore, the material loss is remarkably reduced as compared with that in a conventional method. Therefore, the material cost of the bus bars can be reduced, and the cost of the mold can be lowered. As a result, the centralized power distribution unit can be produced at a low cost.

Preferably, when a linear bus bar body is stamped out by the press molding, the terminal portion and the tabs are integrally formed in a state where the terminal portion and the tabs are coupled to the bus bar body. In this case, a step of welding or the like is not necessary, and hence the production cost can be reduced as compared with the case where a terminal portion and tabs which are previously produced are later attached to the bus bar body. Therefore, the use of such bus bars enables the centralized power distribution unit to be produced at a low cost.

Preferably, the bus bars are stamped out in a state where the bus bar bodies are placed in parallel, and in a state where both ends of the bus bar bodies are substantially aligned with one another. According to the configuration, the material loss in the stamping process is reduced, so that further cost reduction can be attained.

Preferably, when the bus bars are laid out in parallel in a row on a conductive metal plate in order to be stamped from the conductive metal plate, the terminal portion and the tabs of one(s) of the bus bars which is (are) positioned at an outermost side(s) are directed to a center of the bus bar row. In this case, a conductive metal plate of a smaller width can be used as compared with the case where the terminal portion and tabs of the outermost one(s) of the bus bars are directed to the outer side of the bus bar row. Therefore, the material loss in the stamping process is further reduced, so that still further cost reduction can be attained.

BRIEF DESCRIPTION OF THE DRAWINGS

The foregoing and other features of the present invention will become apparent to one skilled in the art to which the present invention relates upon consideration of the invention with reference to the accompanying drawings, wherein:

FIG. 14A is a cross sectional view of the centralized distribution unit taken along line 14a—14a in FIG. 4;

FIG. 14B is a perspective view of the centralized distribution unit shown in FIG. 14A;

FIG. 15A is a cross sectional view of the centralized distribution unit taken along line 15a—15a in FIG. 4;

FIG. 15B is a perspective view of the centralized distribution unit shown in FIG. 15A;

FIG. 19A is a cross sectional view of the first press apparatus, illustrating the apparatus in a closed position;

FIG. 19B is a perspective view of a strip-like blank that has been pressed in the first press apparatus shown in FIG. 19A;

DETAILED DESCRIPTION OF PREFERRED EMBODIMENTS

Figure 1:
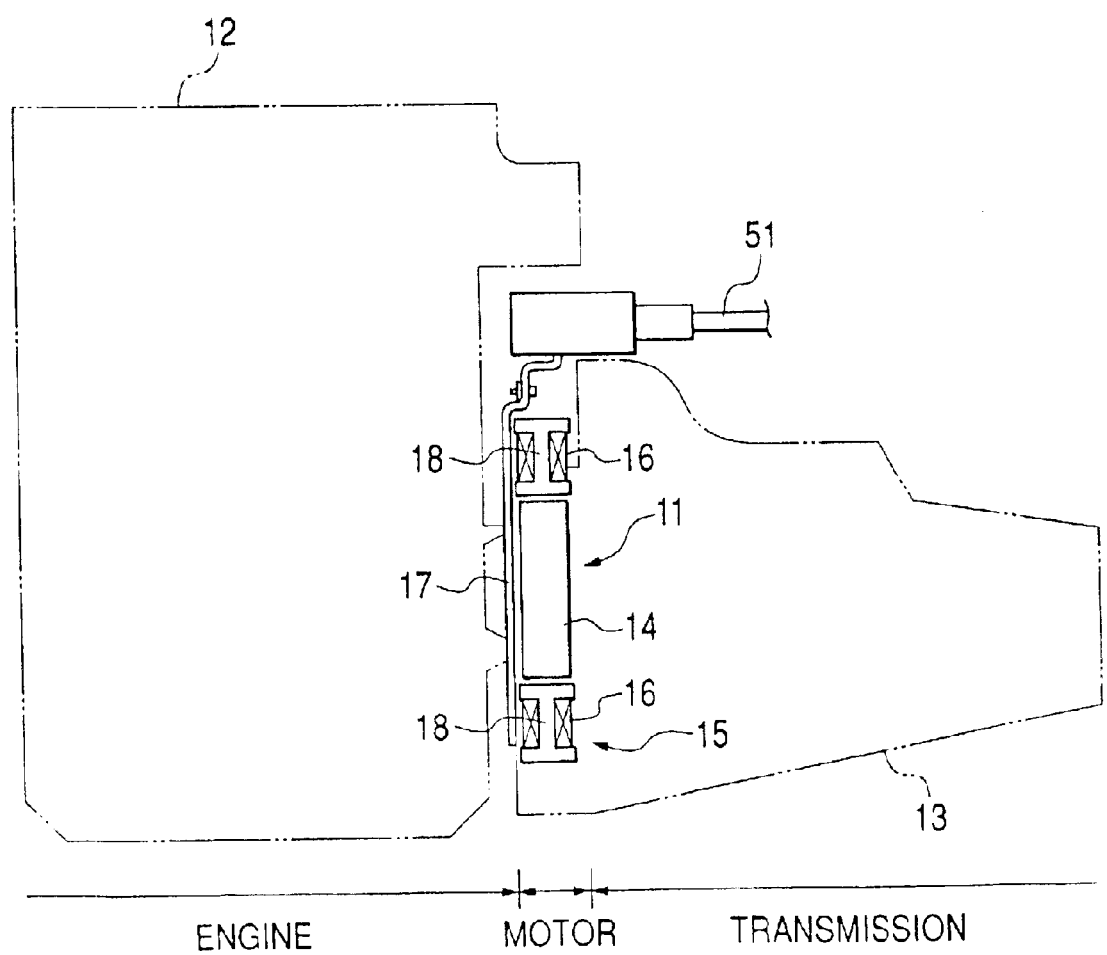
FIG. 1 is a schematic side elevation view of a thin brushless motor.

As shown in FIG. 1, a three-phase thin DC brushless motor 11 to be used in a hybrid automobile is disposed between an engine 12 and a transmission 13. The thin DC brushless motor 11 includes a rotor 14 connected, e.g., directly connected, to a crankshaft of the engine 12, and a ring-like stator 15 enclosing the rotor 14. The stator 15 includes a plurality of magnetic poles that have windings 16 on cores, a stator holder 18 that contains the magnetic poles, and an annular centralized distribution unit 17 that concentratedly distributes currents to the windings 16.

Figure 2:
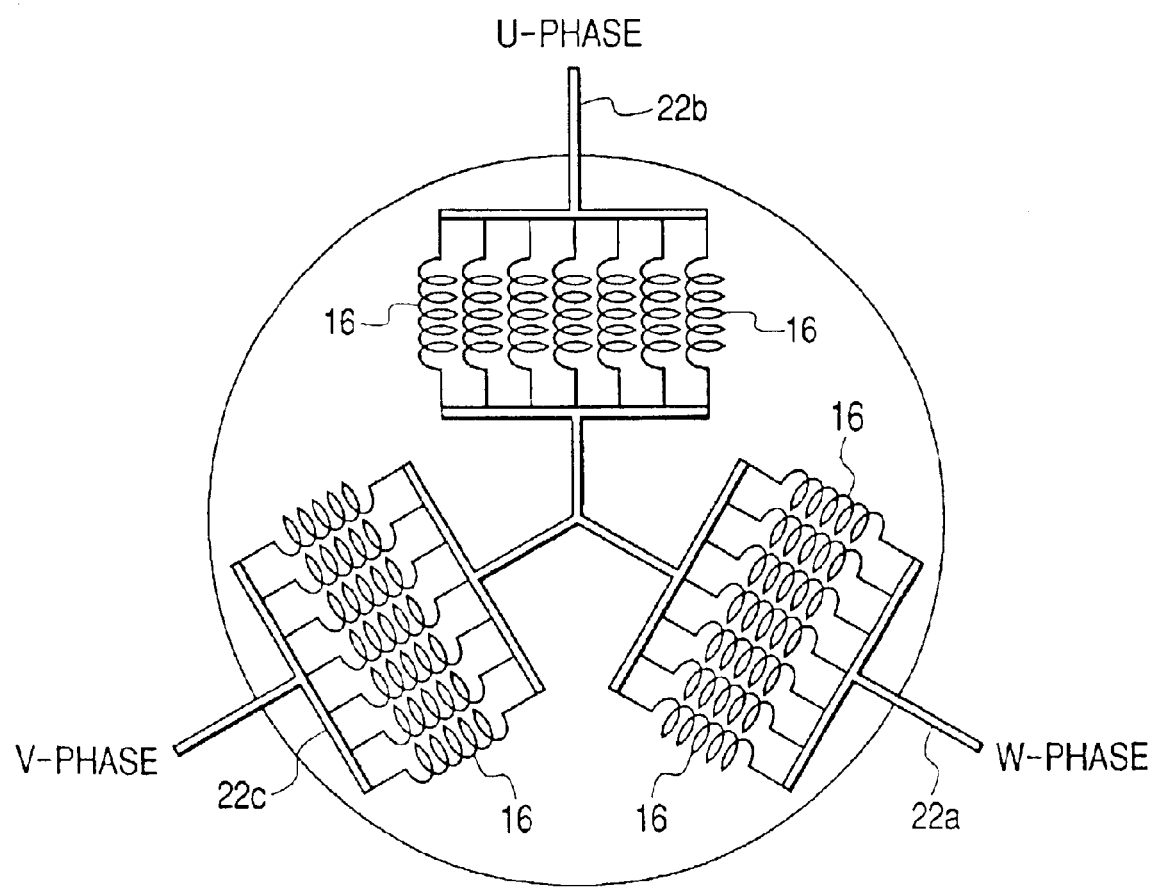
FIG. 2 is a schematic wiring diagram of the thin brushless motor.
Figure 3:
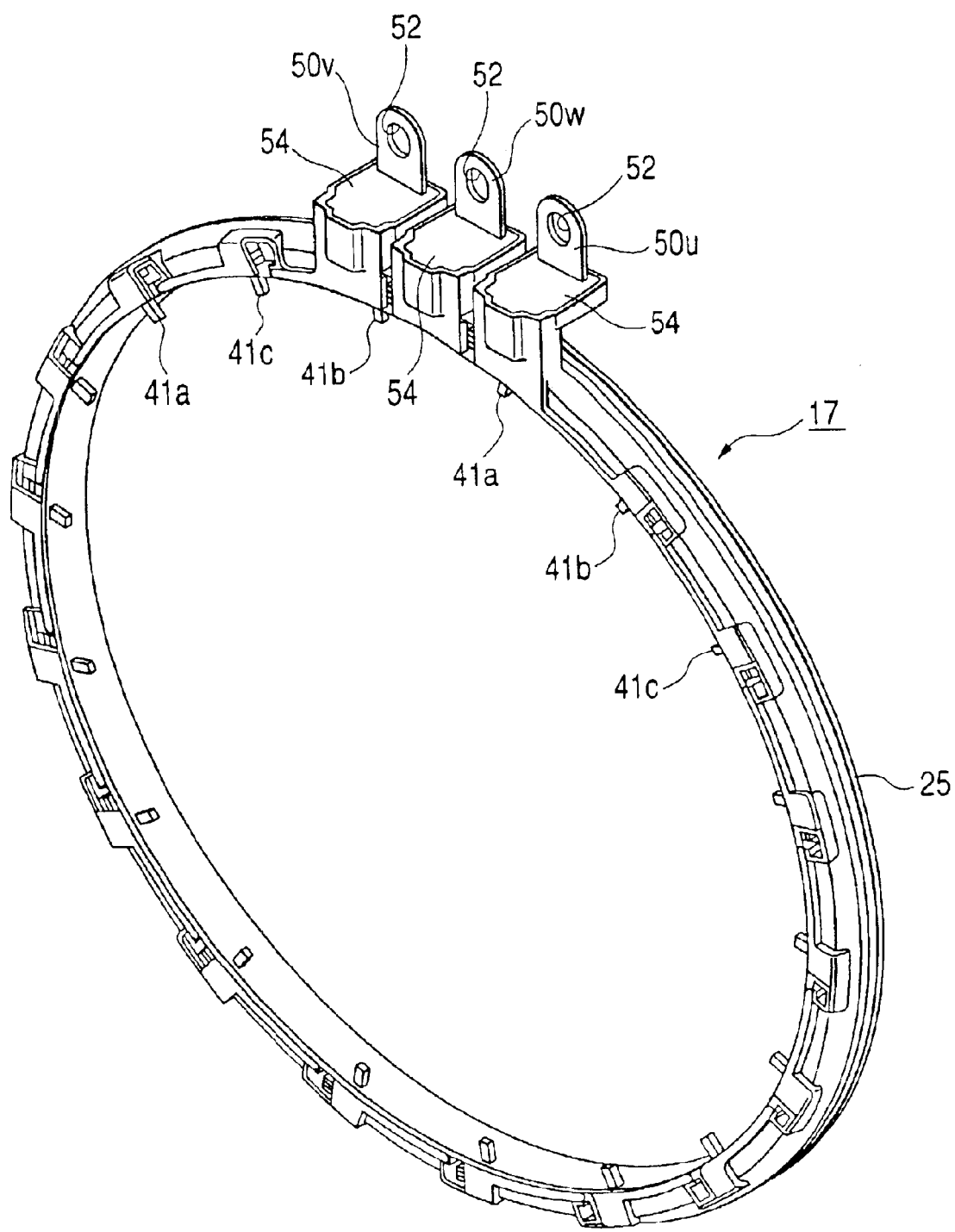
FIG. 3 is a perspective view of a centralized distribution unit.
Figure 4:
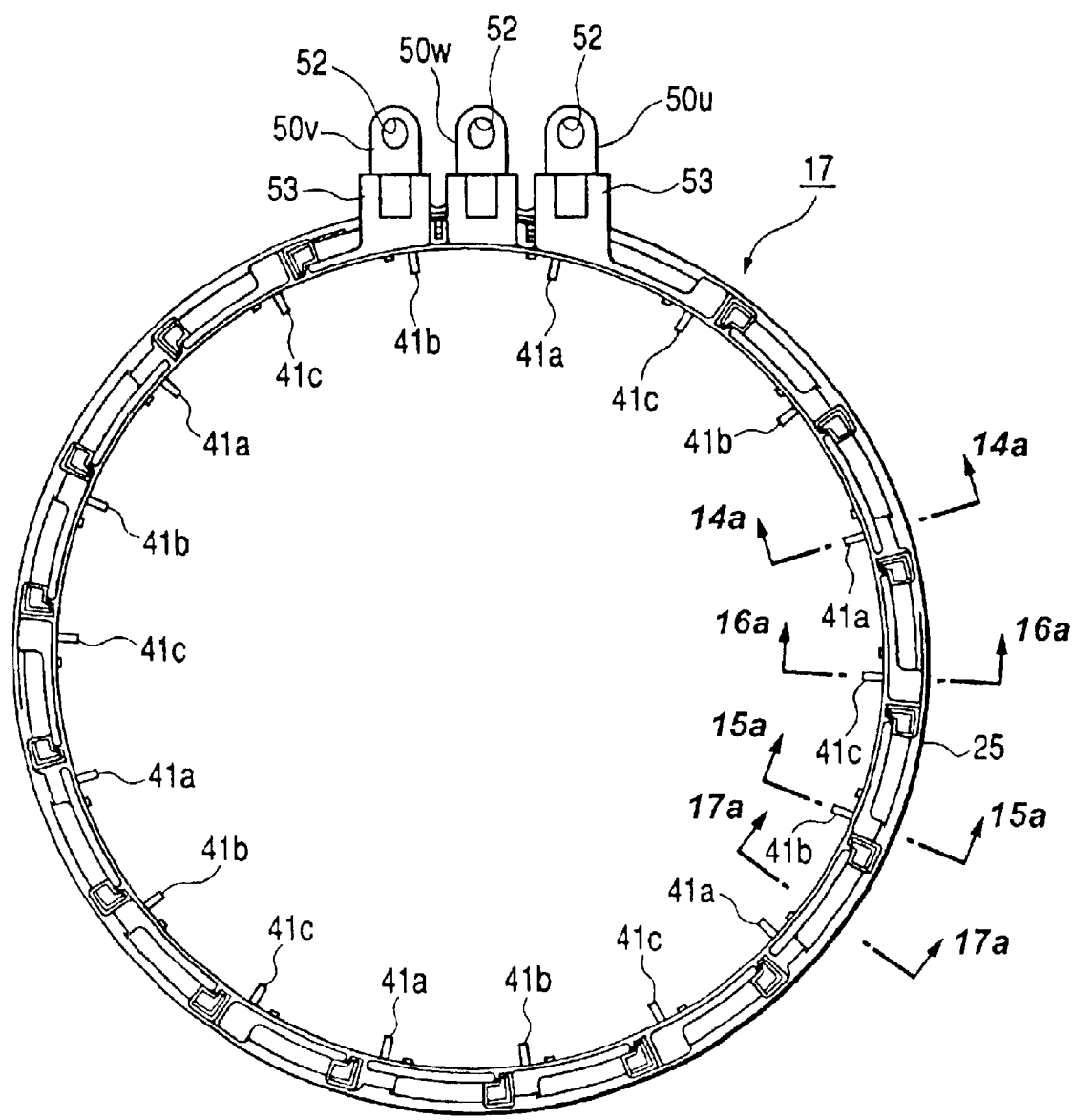
FIG. 4 is a front elevation view of the centralized distribution unit.
Figure 5:
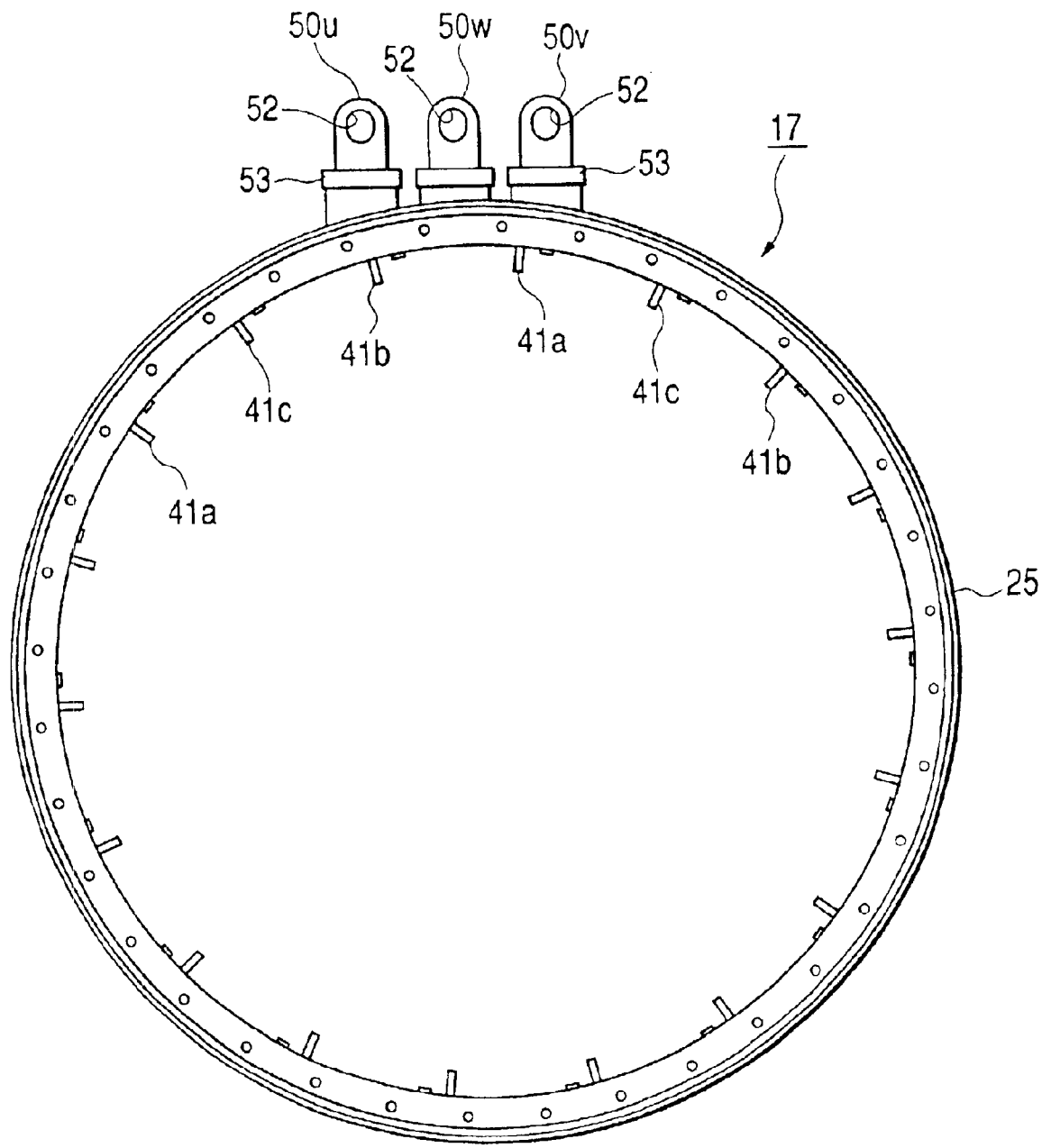
FIG. 5 is a rear elevation view of the centralized distribution unit.

FIG. 2 shows a schematic diagram of the stator 15. As shown in FIG. 2, an end of each phase winding 16 is connected to one of bus bars 22a, 22b, and 22c formed in the centralized distribution unit 17 while the other end is connected to a ring-like conductive member (not shown).

As shown in FIGS. 3 to 6, a continuous annular insulating holder 21 (FIGS. 6A and 6B) made of synthetic resin is embedded in the centralized distribution unit 17. The insulating holder 21 may be made of, for example, PBT (polybutyrene terephthalate), PPS (polyphenylene sulfide), or the like.

In this embodiment, the insulating holder 21 is made of a PPS containing a glass fiber of 40% by weight. The reason why the insulating holder 21 is made of such a material is that the material is superior in its electrical properties (dielectric strength). In particular, in the thin DC brushless motor 11 in the present embodiment, since voltages to be applied to the respective phase bus bars 22a, 22b, and 22c are high, it is important to maintain the dielectric strength in the respective bus bars 22a, 22b, and 22c. The dielectric strength in this case is required to be above 2000V. In addition, PPS has a high mechanical strength as well as a high heat resistance in comparison with a common resin such as a PP (polypropylene) or the like.

Figure 8:
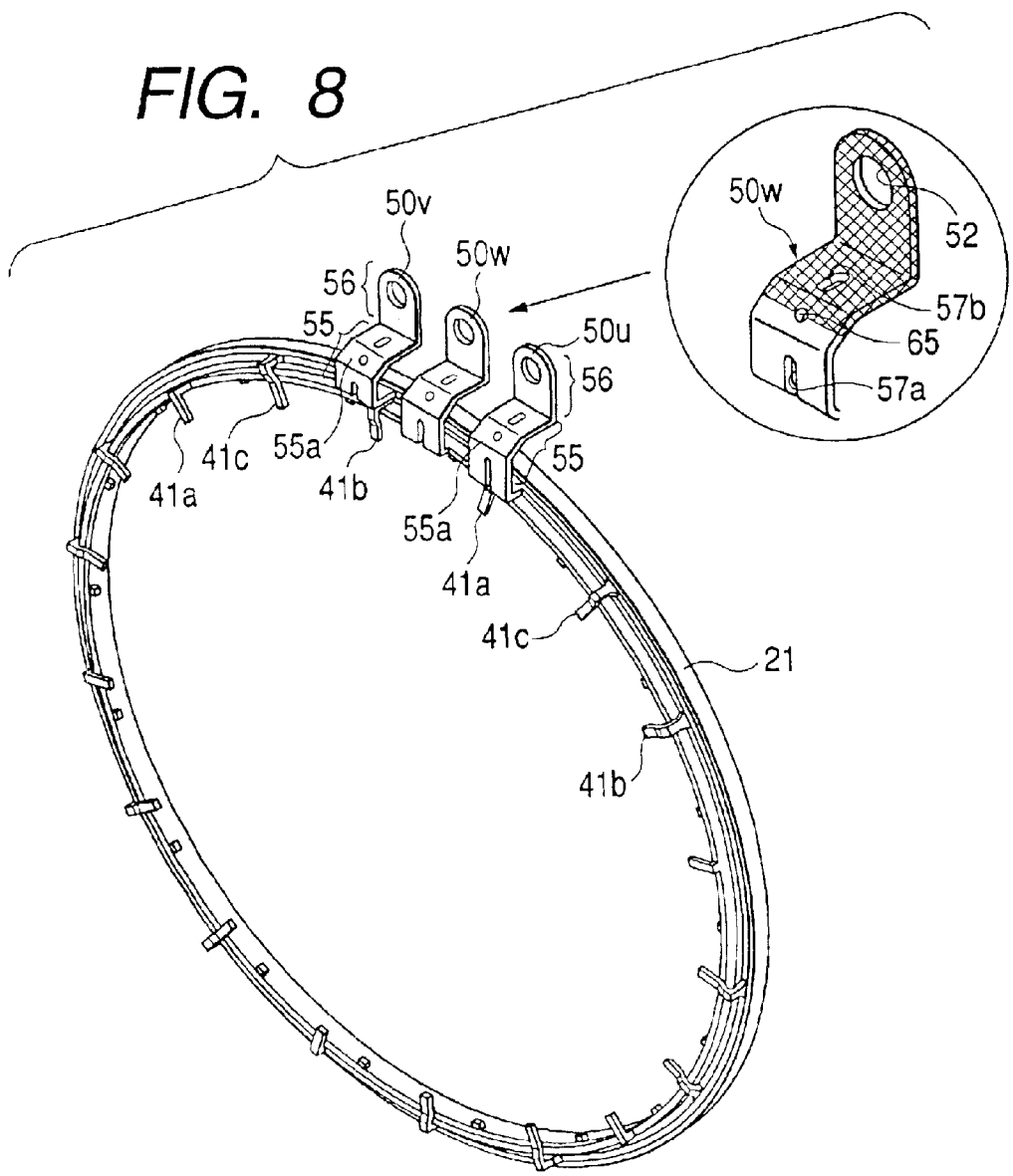
FIG. 8 is a perspective view of an insulating holder.
Figure 9:
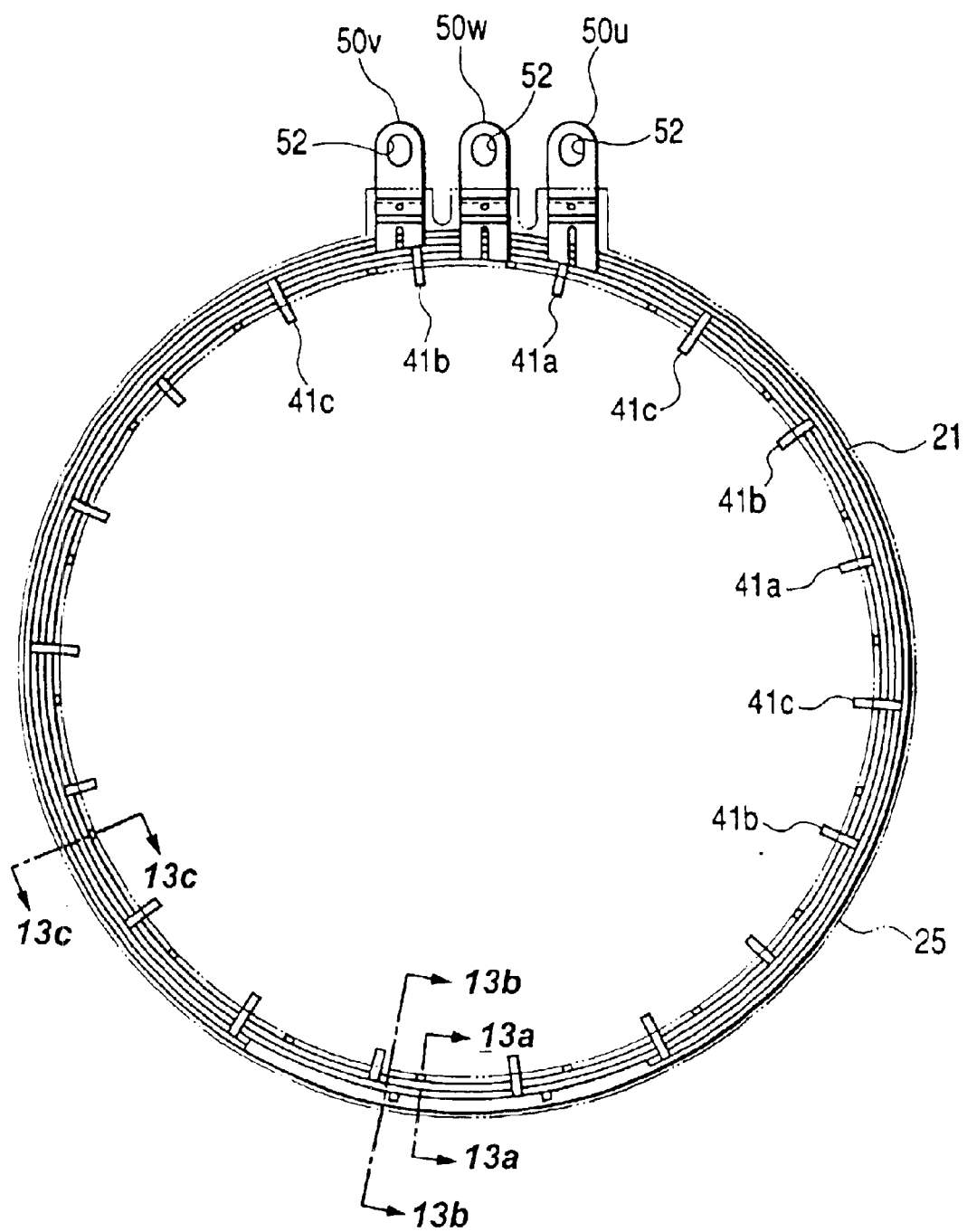
FIG. 9 is a front elevation view of the insulating holder in which bus bars are inserted.
Figure 10:
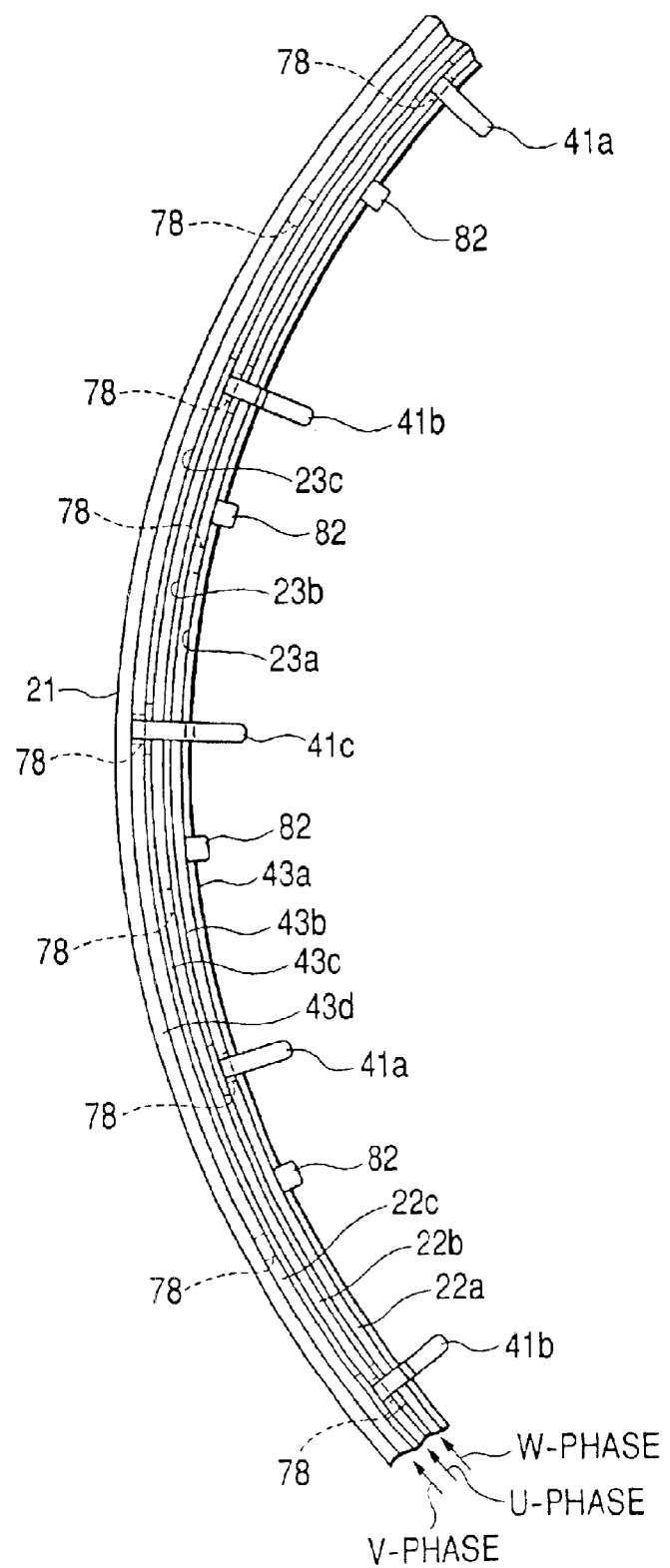
FIG. 10 is an enlarged front elevation view of a part of the insulating holder.

As shown in FIGS. 8, 9, and 10, the insulating holder 21 is provided on one side with holding grooves 23a, 23b, and 23c extending in the circumferential direction. The holding grooves 23a, 23b, and 23c are disposed in parallel at a given distance in the radial direction of the insulating holder 21. The bus bars 22a, 22b, and 22c corresponding to the respective phases are individually inserted into the respective holding grooves 23a, 23b, and 23c, respectively. The respective bus bars 22a, 22b, and 22c are stacked on each other in the radial direction of the centralized distribution unit 17 with the bus bars being spaced from each other at a given distance. Accordingly, the respective holding grooves 23a, 23b, and 23c serve to hold the respective bus bars 22a, 22b, and 22c in the precise positions. The insulating holder 21 and bus bars 22a, 22b, and 22c are entirely covered with a resin insulation layer 25. This covering accomplishes individual insulation between the respective bus bars 22a, 22b, and 22c.

The resin insulation layer 25 is made of a PPS containing a glass fiber, similar to the insulating holder 21. The reason why this material is used in the resin insulation layer 25 is that the material is superior in its electric properties (dielectric strength), heat resistance, and mechanical strength, similar to the reason it is used in the insulating holder 21. The material in the resin insulation layer 25 utilizes a synthetic resin.

In this embodiment, the bus bar 22a at the inside layer corresponds to a W phase, the bus bar 22b at the intermediate layer to a U phase, and the bus bar 22c at the outside layer to a V phase, respectively. For convenience of explanation, the W phase bus bar 22a is referred to as the "inside bus bar 22a" hereinafter, the U phase bus bar 22b as the "intermediate bus bar 22b," and the V phase bus bar 22c as the "outside bus bar 22c," respectively.

The respective bus bars 22a, 22b, and 22c will be explained below. The respective bus bars 22a, 22b, and 22c are formed beforehand by punching out a conductive metallic plate made of a copper or a copper alloy into a strip-like blank using a press apparatus, and bending the blank in the thickness direction to form a discontinuous annular configuration from which a part of an arc is removed (substantially a C-shape). The diameters of the respective bus bars 22a, 22b, and 22c are set to be larger in order from the inside layer to the outside layer. The formed respective bus bars 22a, 22b, and 22c are inserted into the respective holding grooves 23a, 23b, and 23c. This makes it easy to assemble the respective bus bars 22a, 22b, and 22c in the insulating holder 21.

As shown in FIGS. 8 to 11, the respective bus bars 22a, 22b, and 22c are provided with respective pluralities of projecting tabs 41a, 41b, and 41c to which the respective windings 16 are connected. The respective tabs 41a, 41b, and 42c are punched out from the conductive metallic plate simultaneously when the respective bus bars 22a, 22b, and 22c are punched out from the plate by the press apparatus. Consequently, the respective bus bars 22a, 22b, and 22c and the respective tabs 41a, 41b, and 41c are formed integrally together as one piece by a single pressing step. This simplifies the production process in comparison with a process in which the respective tabs 41a, 41b, and 41c are coupled to the respective bus bars 22a, 22b, and 22c by welding.

Figure 11:
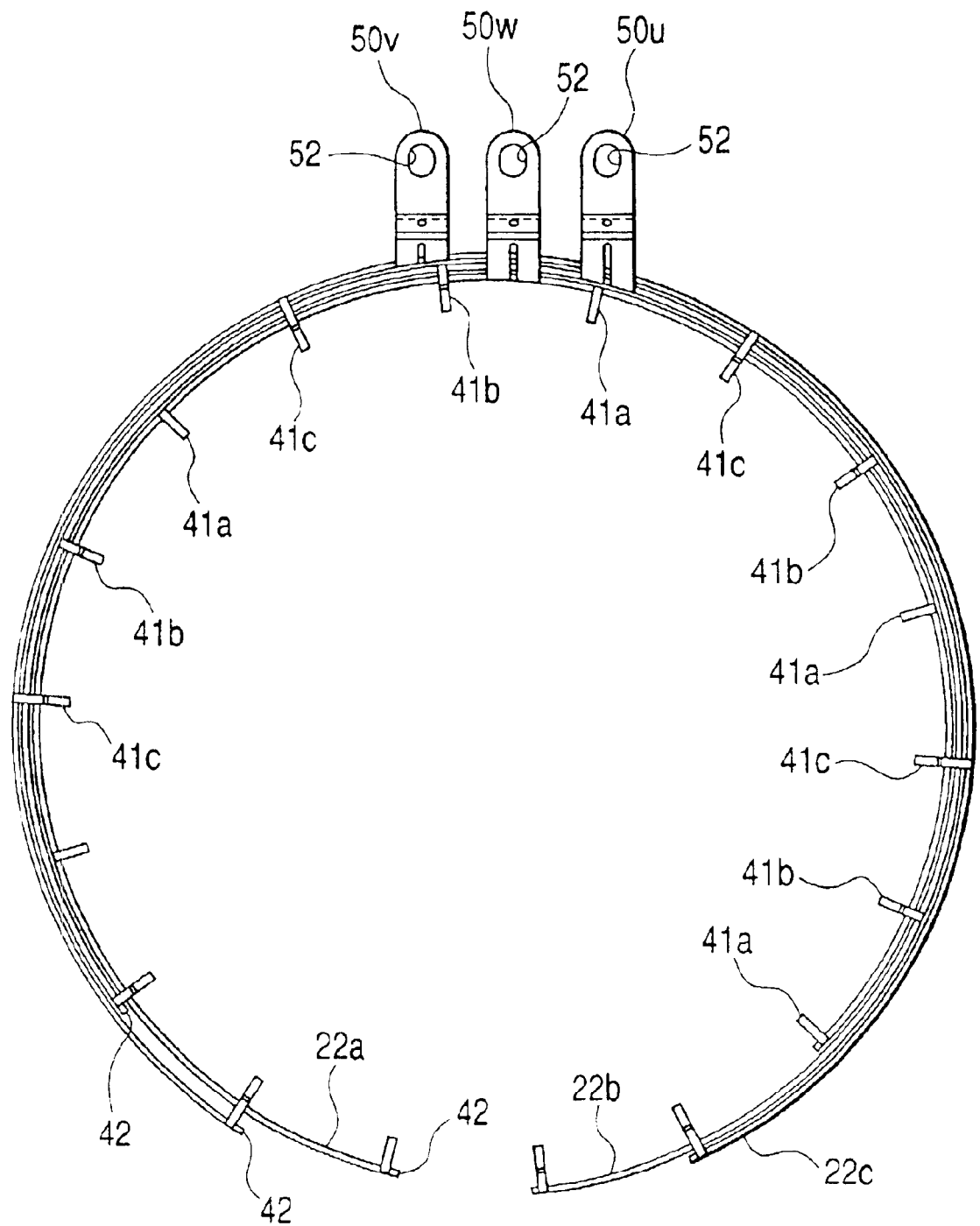
FIG. 11 is a front elevation view of bus bars from which the insulating holder is omitted.

Six of each of tabs 41a, 41b, and 41c are provided on the respective bus bars 22a, 22b, and 22c. The respective tabs 41a, 41b, and 41c in the respective phase are arranged at an even angular distance (i.e., 60 degrees with respect to the center) in the circumferential direction of the respective bus bars 22a, 22b, and 22c. Removed portions 42 of the respective bus bars 22a, 22b, and 22c are displaced from each other by an angle of 20 degrees in the circumferential direction. Consequently, eighteen of the tabs 41a to 41c in total are arranged at an even angular distance of 20 degrees with respect to the center in the circumferential direction of the centralized distribution unit 17. As shown in FIG. 11, in the present embodiment, in the case where the removed portion 42 of the outside bus bar 22c is set to be a reference, the intermediate bus bar 22b is arranged away from the reference by +20 degrees in the clockwise direction. Meanwhile, the inside bus bar 22a is arranged away from the reference by −20 degrees in the counterclockwise direction.

The respective tabs 41a, 41b, and 41c of the respective bus bars 22a, and 22b, and 22c are bent into L-shapes in cross section to direct the distal ends of them to the center of the centralized distribution unit 17.

Each distal end of the respective tabs 41a, 41b, and 41c projects inwardly in the radial direction from the inner periphery of the centralized distribution unit 17. Each winding 16 is connected to a respective projecting portion. The respective tabs 41a, 41b, and 41c are different in length. The distal end of each of the respective tabs 41a, 41b, and 41c is arranged on the same distance from the center of the centralized distribution unit 17. Accordingly, the respective tabs 41a, 41b, and 41c of the respective bus bars 22a, 22b, and 22c are longer in length in the radial direction of the centralized distribution unit in order from the inside bus bar 22a to the outside bus bar 22c.

As shown in FIGS. 15A and 15B, the tabs 41b of the intermediate bus bar 22b are, at the section covered by the resin insulation layer 25, provided with a curved portion 44 raised in the height direction of the walls 43a, 43b, 43c, and 43d that define the holding grooves 23a, 23b, and 23c. The curved portion 44 goes around the top side of the inside bus bar 22a (i.e., another bus bar) in the resin insulation layer 25. The curved portion 44 can provide an increased distance between the tabs 41b and the adjacent bus bar.

Figure 16A:
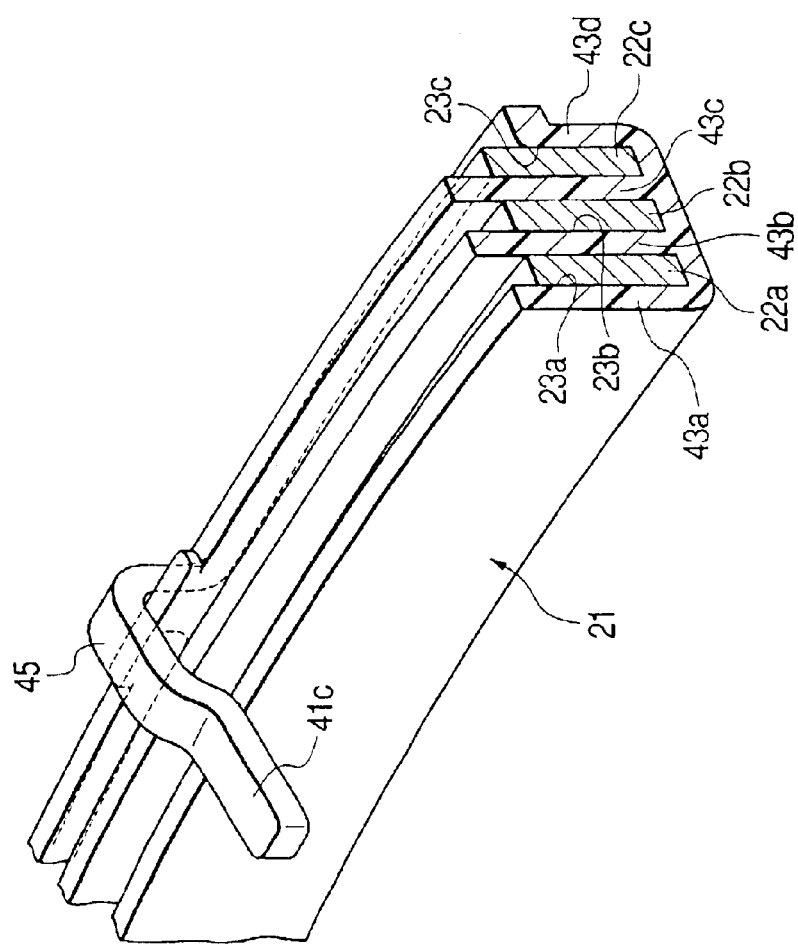
FIG. 16A is a cross sectional view of the centralized distribution unit taken along line 16a—16a in FIG. 4.
Figure 16B:
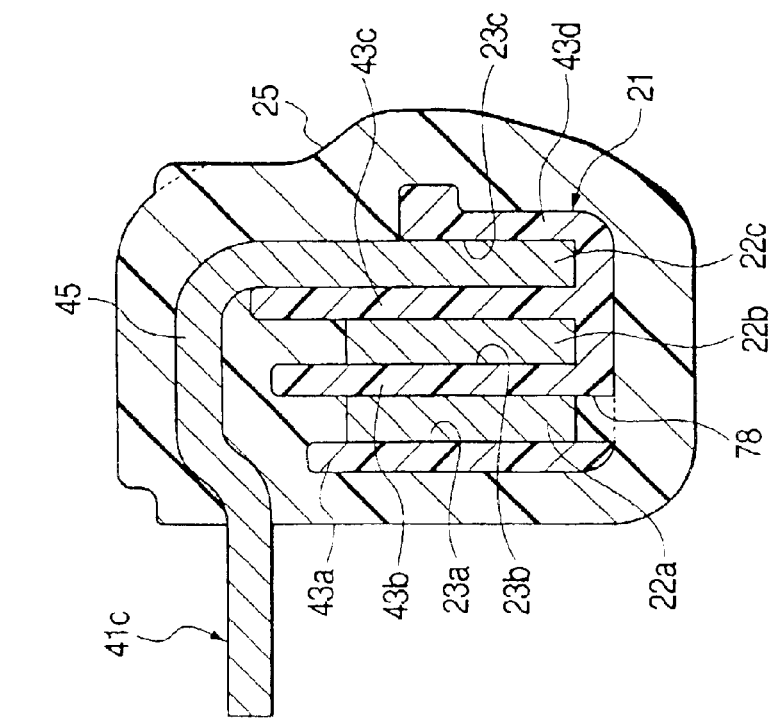
FIG. 16B is a perspective view of the centralized distribution unit shown in FIG. 16A.
Figure 17A:
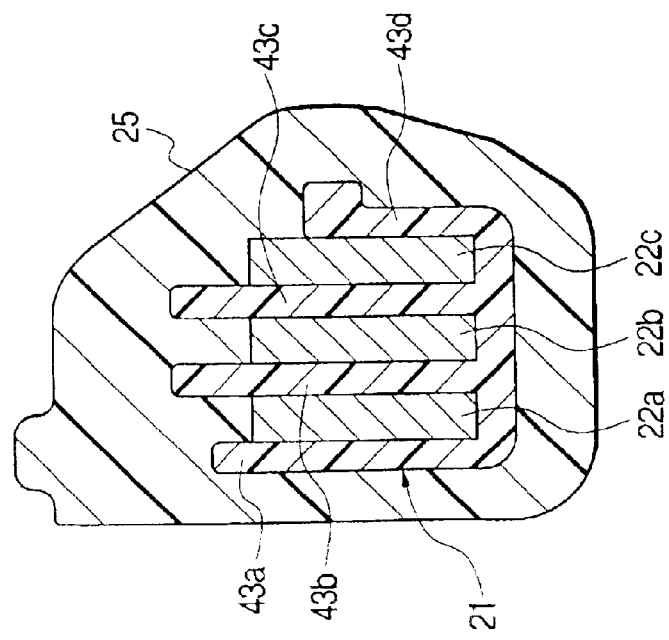
FIG. 17A is a cross sectional view of the centralized distribution unit taken along line 17a—17a in FIG. 4.
Figure 17B:
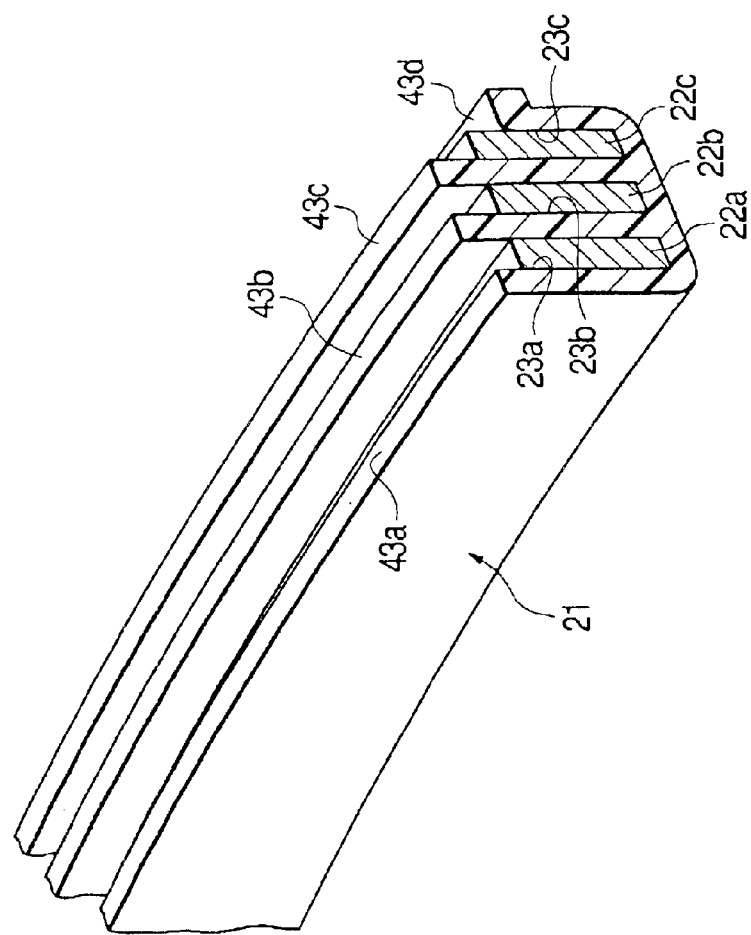
FIG. 17B is a perspective view of the centralized distribution unit shown in FIG. 17A.

As shown in FIGS. 16A and 16B, the tabs 41c of the outside bus bar 22c are, at the section covered by the resin insulation layer 25 provided with a curved portion 45 raised in the height direction of the walls 43a to 43d. The curved portion 45 goes around the top sides of the intermediate bus bar 22b as well as the inside bus bar 22a (i.e., other bus bars) in the resin insulation layer 25. The curved portion 45 can provide an increased distance between the tabs 41c and the adjacent bus bars. Since the curved portion 45 goes around two bus bars 22a and 22b, the curved portion 45 is longer than the curved portion 44 of the tab 41b on the intermediate bus bar 22b.

As shown in FIGS. 14A and 14B, the tabs 41a of the inside bus bar 22a have no curved portion on the proximal end, but rather have a right-angled portion. The tabs 41a are not required to be at an increased distance, since there is no adjacent bus bar for the tabs to go around.

As shown in FIGS. 14A and 14B, inside projecting pieces 47 are formed integrally with wall 43b, and are positioned between tab forming sections of the inside bus bar 22a from tab non-forming sections of the intermediate bus bar 22b adjacent the inside bus bar 22a. The inside projecting pieces 47 can provide an increased creepage distance between the inside bus bar 22a and the intermediate bus bar 22b adjacent the inside bus bar 22a. Six inside projecting pieces 47 in total, made of a synthetic resin, are provided on the wall 43b and arranged at an even spacing in the circumferential direction of the insulating holder 21. The respective inside projecting pieces 47 correspond in position to the respective tabs 41a formed on the inside bus bar 22a. The portions of wall 43b having the inside projecting pieces 47 are higher than the portions of wall 43b that space the tab non-forming sections of the inside bus bar 22a and intermediate bus bar 22b.

As shown in FIGS. 15A and 15B, an outside projecting piece 48 is formed integrally with wall 43c that spaces a tab forming section of the intermediate bus bar 22b from a tab non-forming section of the outside bus bar 22c adjacent the intermediate bus bar 22b. The outside projecting piece 48 can provide an increased distance between the intermediate bus bar 22b and the outside bus bar 22c adjacent the intermediate bus bar 22b. Six outside projecting pieces 48 in total, made of a synthetic resin, are provided on the wall 43c and arranged at an even spacing in the circumferential direction of the insulating holder 21. The respective outside projecting pieces 48 correspond to the respective tabs 41b formed on the intermediate bus bar 22b. The portions of wall 43c having the outside projecting piece 48 are higher than the portions of wall 43c that space the tab non-forming sections of the intermediate bus bar 22b and outside bus bar 22c.

As shown in FIGS. 3 to 7, the respective bus bars 22a, 22b, and 22c are provided on their sides with respective terminal portions 50w, 50u, and 50v formed integrally together with the respective bus bars. The respective terminal portions 50w, 50u, and 50v project outwardly from the resin insulation layer 25. The respective terminal portions 50w, 50u, and 50v are connected through electric power source cables 51 shown in FIG. 1 to a battery (not shown) for the thin DC brushless motor 11. The respective terminal portions 50w, 50u, and 50v are punched out simultaneously when the bus bars 22a, 22b, and 22c are punched out from the conductive metallic plate by a press apparatus. Accordingly, the respective terminal portions 50w, 50u, and 50v are formed integrally together as one piece with the bus bars 22a, 22b, and 22c, respectively, by a single pressing process. This can simplify the production process in comparison with a procedure in which the respective terminal portions 50u, 50v, and 50w are welded to the respective bus bars 22a, 22b, and 22c.

Figure 6A:
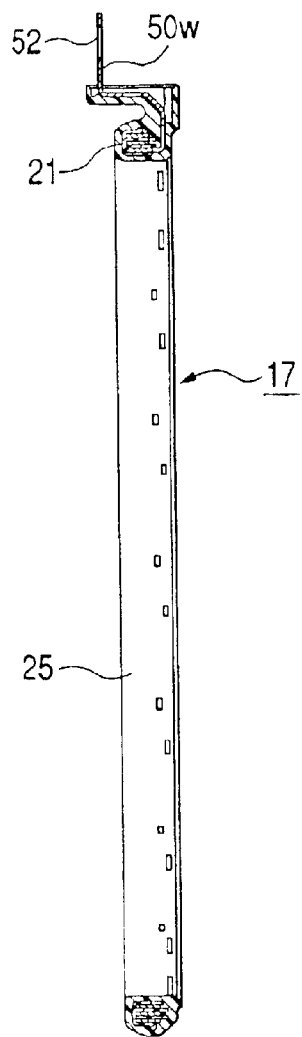
FIG. 6A is a cross sectional view of the centralized distribution unit.
Figure 6B:
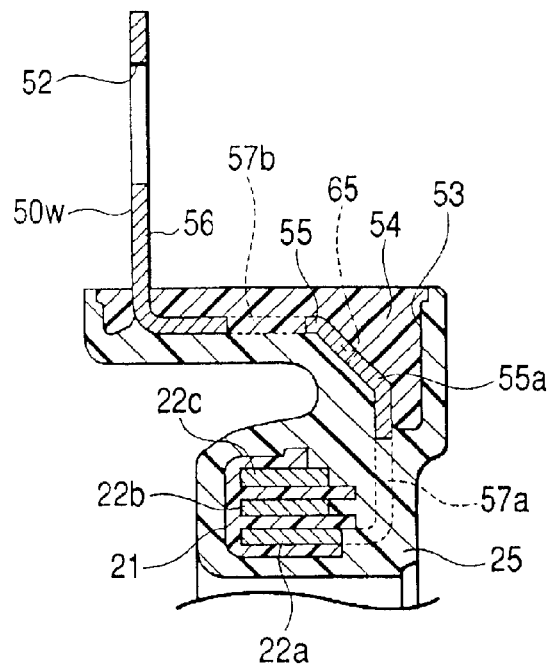
FIG. 6B is an enlarged cross sectional view of a terminal portion of the unit.
Figure 6C:
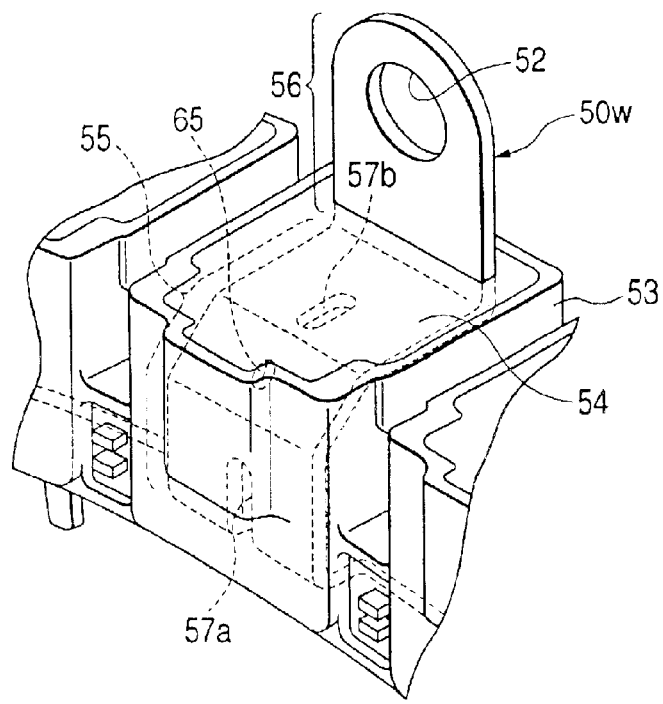
FIG. 6C is an enlarged perspective view of the terminal portion shown in FIG. 6B.
Figure 7:
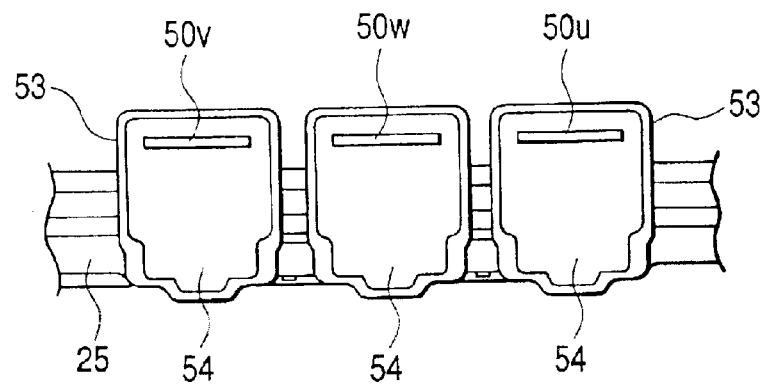
FIG. 7 is a plan elevation view of a terminal portion of the centralized distribution unit.

As shown in FIGS. 6 and 7, the respective terminal portions 50u, 50v, and 50w are provided on the distal ends with bolt through-holes that permit attachment bolts (not shown) for the electric power source cables 51 to pass. Resin-containing sections 53 are formed integrally together with the outer periphery of the resin insulation layer 25 to enclose the outer peripheries from the proximal ends to the central portions of the respective terminal portions 50u, 50v, and 50w. The resin-containing sections 53 are filled with sealing material 54 made of an insulative thermosetting resin. The sealing material 54 embeds portions disposed near the proximal ends away from the bolt through-holes 52 and exposed from the resin insulation layer 25 on the respective terminal portions 50u, 50v, and 50w. Waterproof-ness and airtight-ness functions are enhanced by the sealing material 54 embedding the parts of the respective terminal portions 50u, 50v, and 50w. In the present embodiment, the sealing material 54 is preferably a silicone-based thermosetting resin. Alternatively, the thermosetting resin may be any resin other than a silicone-based resin.

Figure 28:
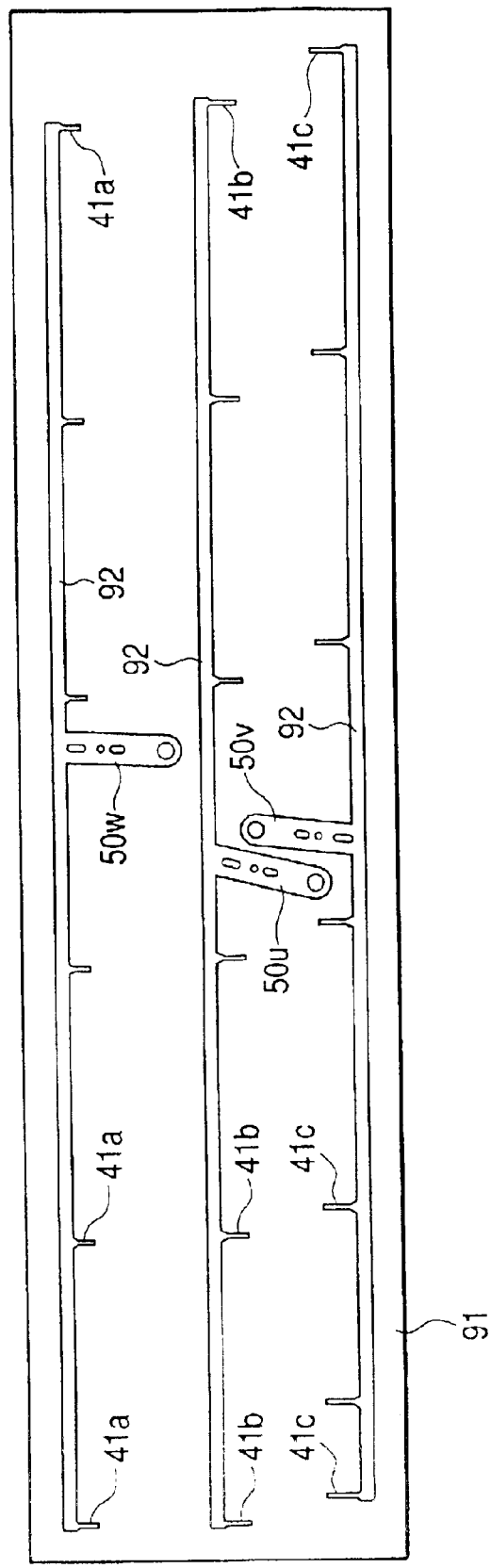
FIG. 28 is a plan view of a conductive metallic plate to be punched into the strip-like blanks, illustrating a process for producing the centralized distribution unit.

FIG. 28 is a developed view of the bus bars 22a, 22b, and 22c. As shown in FIG. 28, the respective terminal portions 50u, 50v, and 50w are disposed substantially on longitudinally central parts of the respective bus bars 22a, 22b, and 22c. The numbers of the respective tabs 41a, 41b, and 41c on opposite sides of the respective terminal portions 50u, 50v, and 50w are preferably the same. In more detail, three tabs 41a, 41b, and 41c are provided on one side of the respective terminal portions 50u, 50v, and 50w while three tabs 41a, 41b, and 41c are provided on the other side of the respective terminal portions 50u, 50v, and 50w. The reason why the same numbers of the tabs 41a, 41b, and 41c are provided on the opposite sides of the terminal portions 50u, 50v, and 50w is to permit equal amounts of current to flow in the tabs 41a, 41b, and 41c.

As shown in FIGS. 6 and 8, the respective terminal portions 50u, 50v, and 50w include embedded sections 55 covered by the sealing material 54 on their proximal ends, and exposed sections 56 having the bolt through-holes 52 and not covered by the sealing material 54 on their distal ends. The embedded sections 55 are pressed to form central ramp portions 55a. These central ramp portions 55a can save material in comparison with central right-angled portions, and reduce weights of the bus bars 22a, 22b, and 22c.

Slits 57a and 57b are provided on opposite sides of the embedded portions of the respective terminal portions 50u, 50v, and 50w. Both slits 57a and 57b extend in the longitudinal directions of the respective terminal portions 50u, 50v, and 50w. The two slits 57a and 57b reduce a part of the embedded section 55, thereby making a width of the reduced portion narrower than that of a non-reduced portion. Such structure can make a difference in reducing heat contraction between the resin insulation layer 25 and the bus bars 22a to 22c when the resin insulation layer encloses the insulating holder 25 during insert molding. The number and width of the slits 57a and 57b may be changed without lowering mechanical strengths of the respective terminal portions 50u, 50v, and 50w. For example, two slits 57a and 57b may be provided on the opposite sides of the embedded section 55, respectively.

As shown by cross hatching in FIG. 8, parts of the exposed section 56 and embedded section 55 on the respective terminal portions 50u, 50v, and 50w are covered by tinning. In more detail, tinning covers an area from the distal end of the exposed section 56 to the central ramp portion 55a of the embedded section 55. This tinning can prevent the bus bars 22a, 22b, and 22c from being subject to corrosion by oxidation.

After the respective terminal portions 50u, 50v, and 50w are bent by a first press apparatus 60 shown in FIGS. 18 and 19, a second press apparatus 61 shown in FIG. 20 further bends them.

The first press apparatus 60 will be explained below with reference to FIGS. 18 and 19. As shown in FIGS. 18 and 19, the first press apparatus 60 bends the respective terminal portions 50u, 50v, and 50w. The first press apparatus 60 includes a stationary lower die member 62 and a movable upper die member 63. When the upper die member 63 moves down toward the lower die member 62, both dies are closed. Conversely, when the upper die member 63 moves up away from the lower die member 62, both dies are opened.

The lower die member 62 is provided on the upper surface with a lower forming V-shaped recess 62a and a lower forming V-shaped protrusion 62b adjacent the recess 62a. A pilot pin 64 is formed at the top of the lower forming protrusion 62b. When the pilot pin 64 passes through a pilot hole 65 formed in the central ramp portion 55a of each of the terminal portions 50u, 50v, and 50w, the respective terminal portions 50u, 50v, and 50w are positioned.

On the other hand, the upper die member 63 is provided on the lower surface with an upper forming V-shaped protrusion 63a and an upper forming V-shaped recess 63b adjacent the protrusion 63a. The upper forming protrusion 63a is opposed to the lower forming recess 62a while the upper forming recess 63b is opposed to the lower forming protrusion 62b. When the upper die member 63 moves down toward the lower die member 62 to the closed position, the upper forming protrusion 63a engages the lower forming recess 62a. The upper forming recess 63b is provided on the bottom surface with an escape recess 66. When the lower and upper die members 62 and 63 are driven to the closed position, the pilot pin 64 enters the escape recess 66, thereby preventing the pilot pin 64 and upper die member 63 from interfering with each other.

Next, a second press apparatus 61 will be explained below by referring to FIG. 20. As shown in FIG. 20, the second press apparatus 61 bends boundary sections between the respective terminal portions 50u, 50v, and 50w and the respective bus bars 22a, 22b, and 22c. The second press apparatus 61 comprises a stationary lower die member 67 and a movable upper die member 68. When the upper die member 68 moves down toward the lower die member 67, both dies are closed. Conversely, when the upper die member 68 moves up away from the lower die member 67, both dies are opened.

The lower die member 67 is provided on the upper surface with a lower forming protrusion 67a that engages the embedded section 55 on the respective terminal portions 50u, 50v, and 50w. An insertion pin 69 is formed near the lower forming protrusion 67a on the lower die member 67 to position the terminal portions 50u, 50v, and 50w. When the respective terminal portions 50u, 50v, and 50w are set on the lower die member 67, the insertion pin 69 passes through the respective bolt through-hole 52. When the insertion pin 69 passes through the bolt through-hole 52, the respective terminal portions 50u, 50v, and 50w are prevented from being displaced.

The upper die member 68 is provided on the lower surface with an upper forming recess 68a opposing the lower forming protrusion 67a. When the upper and lower die members 68 and 67 are driven to the closed position, the upper forming recess 68a engages the lower forming protrusion 67a. The thickness of the portion of the upper die member 68 other than the portion at which the upper forming recess 68a is formed is designed so that the insertion pin 69 on the lower die member 67 does not interfere with the upper die member 68 when the upper and lower die members are driven to the closed position.

Figure 18B:
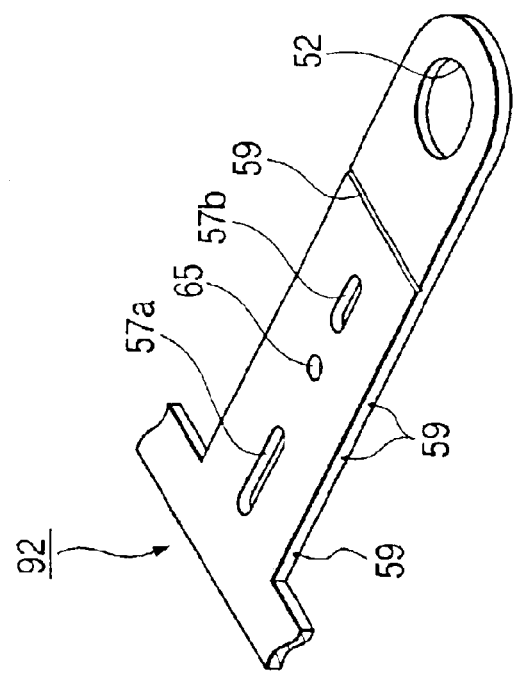
FIG. 18B is a perspective view of a part of a strip-like blank to be pressed by the first press apparatus shown in FIG. 18A.
Figure 18A:
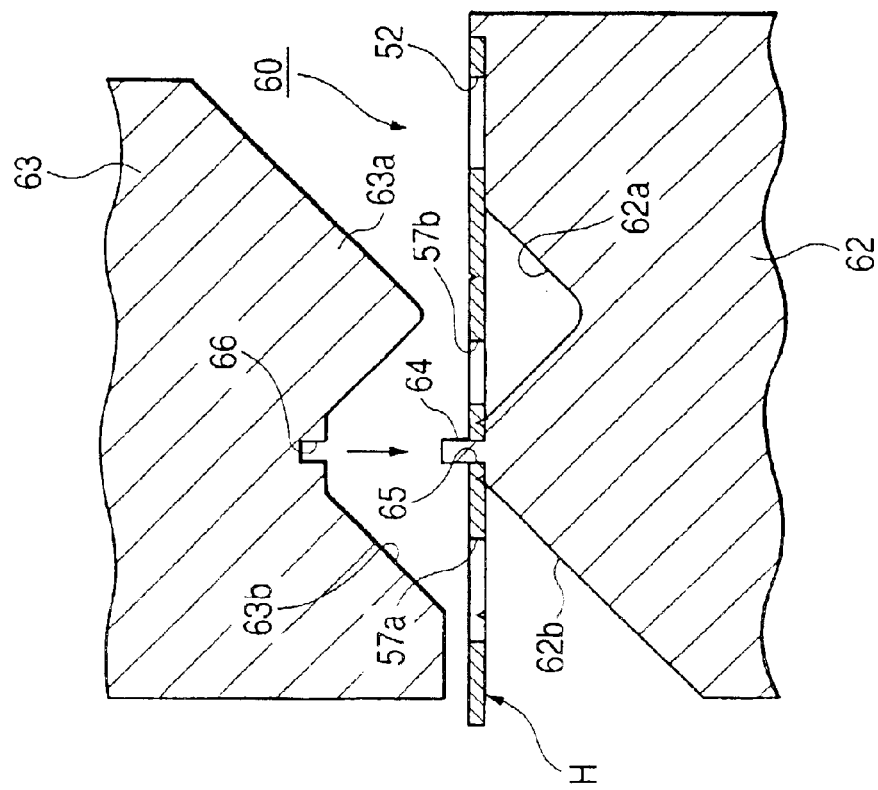
FIG. 18A is a cross sectional view of a first press apparatus, illustrating the apparatus in an open position.
Figure 21A:
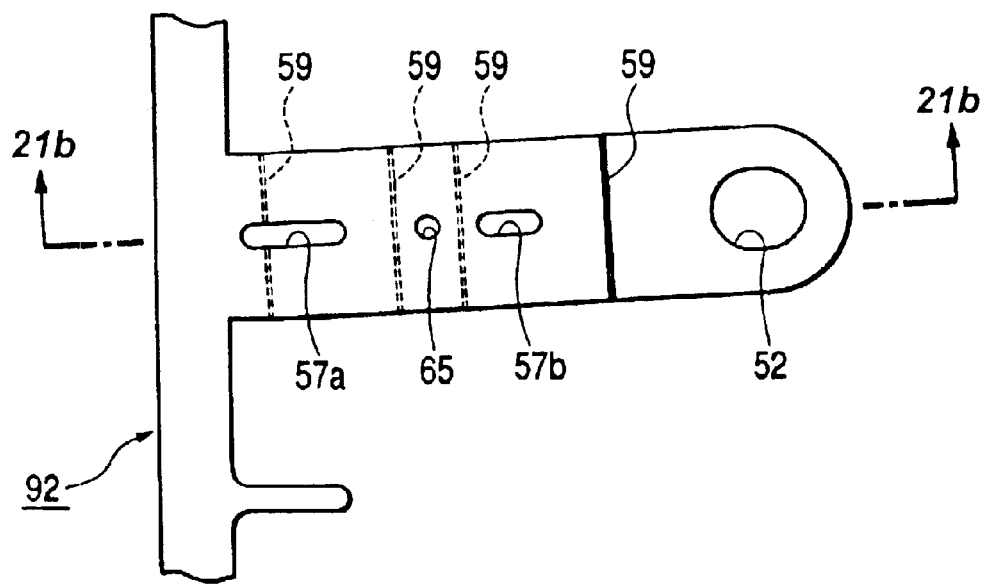
FIG. 21A is a plan elevation view of a strip-like blank, illustrating the blank in a state before a terminal portion of the bus bar is bent.
Figure 21B:
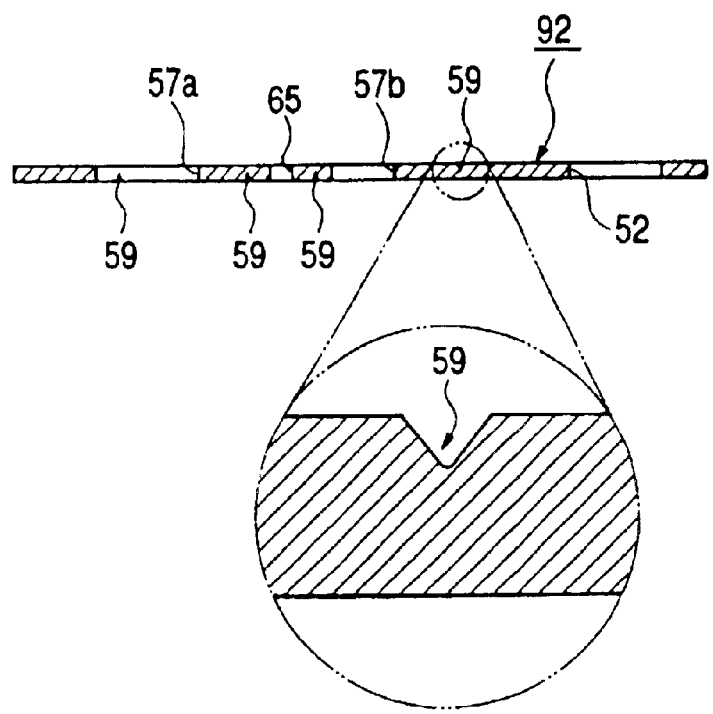
FIG. 21B is a longitudinal sectional view of the blank taken along line 21b—21b in FIG. 21B.

As shown in FIG. 18a and FIGS. 21A and 21B, a plurality of notches 59 extending in the lateral (width) direction are formed on the areas to be bent on the respective terminal portions 50u, 50v, and 50w by the first and second press apparatuses 60 and 61. Each notch 59 is formed in a surface of a strip-like blank 92 punched out from the conductive metallic plate before forming the respective terminal portions 50u, 50v, and 50w. In the present embodiment, one notch is formed in one surface of the strip-like blank 92 corresponding to the respective terminal portions 50u, 50v, and 50w, while three notches are formed in the other surface of the blank 92. The strip-like blank 92 is bent inwardly at the notch 59.

Next, a process for bending the respective terminal portions 50u, 50v, and 50w by using the first and second press apparatuses 60 and 61 mentioned above will be explained.

As shown in FIGS. 18A and 18B, when the upper and lower die members 63 and 62 of the first press apparatus 60 are driven to the opened position, the strip-like blanks 92 punched out from the conductive metallic plate are put on the lower die member 62. The pilot pin 64 on the lower die member 62 passes through the pilot hole 65 formed in a respective strip-like blank 92 to prevent or reduce displacement of the blank 92.

As shown in FIGS. 19A and 19B, when the upper and lower die members 63 and 62 are driven to the closed position, the strip-like blank 92 is clamped between the lower forming recess 62a and the upper forming protrusion 63a and between the lower forming recess 62b and the upper forming protrusion 63b. Thus, the respective strip-like blanks 92 are bent at the portions corresponding to the respective terminal portions 50u, 50v, and 50w to form the respective terminal portions 50u, 50v, and 50w. Thereafter, the upper and lower die members 63 and 62 are driven to the opened position and the strip-like blank 92, in which the respective terminal portion 50u, 50v, or 50w is formed, is removed from the lower die member 62.

Figure 20A:
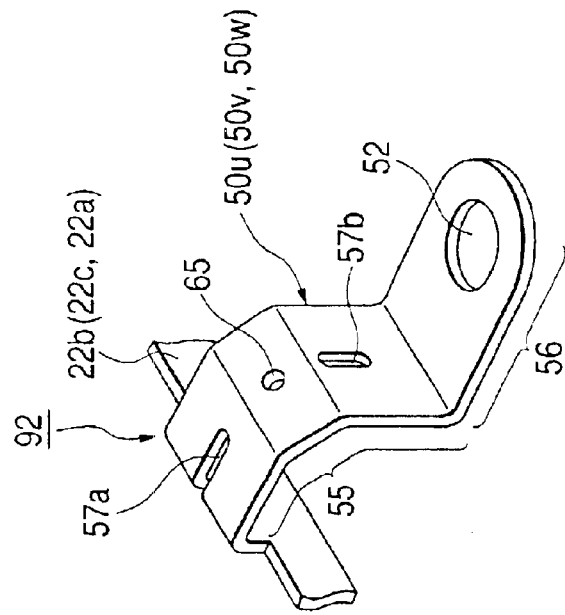
FIG. 20A is a cross sectional view of a second press apparatus, illustrating the apparatus in an open position.
Figure 20B:
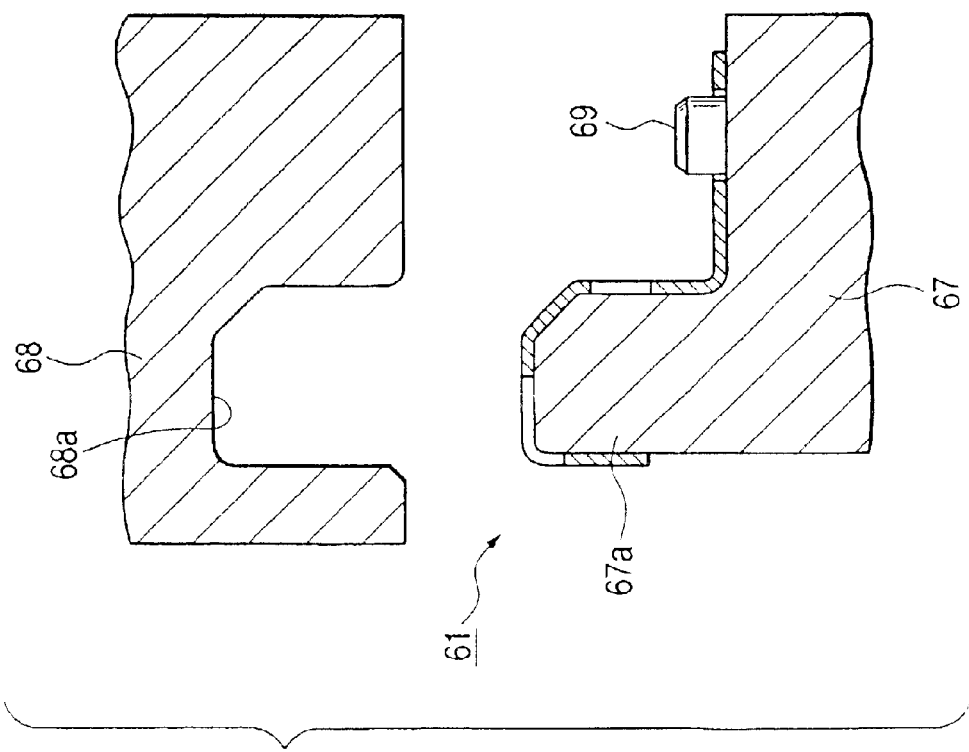
FIG. 20B is a perspective view of a strip-like blank that has been pressed in the second press apparatus shown in FIG. 20A.

As shown in FIGS. 20A and 20B, when the upper and lower die members 68 and 67 of the second press apparatus 61 are driven to the opened position, the respective terminal portion 50u, 50v, or 50w formed by the first press apparatus 60 engages the lower die member 62. The insertion pin 69 passes through the bolt through-hole 52 formed in the respective terminal portions 50u, 50v, or 50w to prevent or reduce displacement of the blank 92.

When the upper and lower die members 68 and 67 are driven to the closed position, an end of the strip-like blank 92, namely a portion corresponding to the respective bus bars 22a, 22b, or 22c, is clamped between the lower forming protrusion 67a and the upper forming recess 68a to bend at a right angle the boundary areas between the respective bus bar 22a, 22b, or 22c and the respective terminal portion 50u, 50v, or 50w. Thereafter, the upper and lower die members 68 and 67 are driven to the opened position and the strip-like blank 92, in which the respective terminal portion 50u, 50v, or 50w is formed, is removed from the lower die member 67.

As shown in FIGS. 24 to 27, the resin insulation layer 25 for covering the insulating holder 21 is formed by an insert-molding mold 70. The insert-molding mold 70 comprises a stationary lower mold member 71 and a movable upper mold member 72. The upper mold member 72 can move to and from the lower mold member 71. When the upper mold member 72 moves down to the lower mold member 71, the mold 70 is placed in a closed position. When the upper mold member 72 moves up from the lower mold member 71, the mold 70 is placed in an open position.

A forming recess 71a in the lower mold member 71 is opposed to a forming recess 72a in the upper mold member 72. When the lower and upper mold members 72 and 71 are driven to the closed position, the forming recesses 72a and 71a define an annular cavity 73. A molten resin material 90 is poured through a gate (not shown) into the cavity 73 to form the resin insulation layer 25.

The upper mold member 72 is provided with upper mold member supports 80 that push an upper surface of the insulating holder 21 to be contained in the cavity 73. The upper mold member supports 80 can move out from and into an inner top surface of the upper forming recess 72a. Although not shown in the drawings, a plurality of upper mold member supports 80 (eighteen in the present embodiment) are provided in the upper mold member 72. The upper mold member supports 80 are arranged at an even spacing on the circumference of the insulating holder 21, except for the portions where the terminal portions 50u, 50v, and 50w are located. When the upper mold member supports 80 are advanced out from the upper forming recess 72a, a plurality of latch grooves 81 formed in the ends of the supports 80 engage the wall 43b that spaces the inside bus bar 22a from the intermediate bus bar 22b, and also engage the wall 43c that spaces the intermediate bus bar 22b from the outside bus bar 22c. Under this engagement condition, distal end surfaces of the upper mold member supports 80 come into contact with upper end edges of the respective bus bars 22a, 22b, and 22c. Consequently, the upper mold member supports 80 push the insulating holder 21 (an upper portion of the holder 21 in FIG. 24).

The lower mold member 71 is provided with holder support pins 74 that support the insulating holder 21 to be contained in the cavity 73. The holder support pins 74 can move out from a bottom surface of the lower forming recess 71a into the cavity 73 and move from the cavity 73 into the bottom surface. Although not shown in the drawings, a plurality of holder support pins 74 (thirty-six pins in the present embodiment) are provided in the lower mold member 71. The holder support pins 74 are arranged at an even spacing on the circumference of the insulating holder 21. Each holder support pin is preferably formed into a stick-like configuration having a tapered end. Preferably, the tapered end of each holder support pin 74 has a taper angle of about 30 to 150 degrees.

Figure 22:
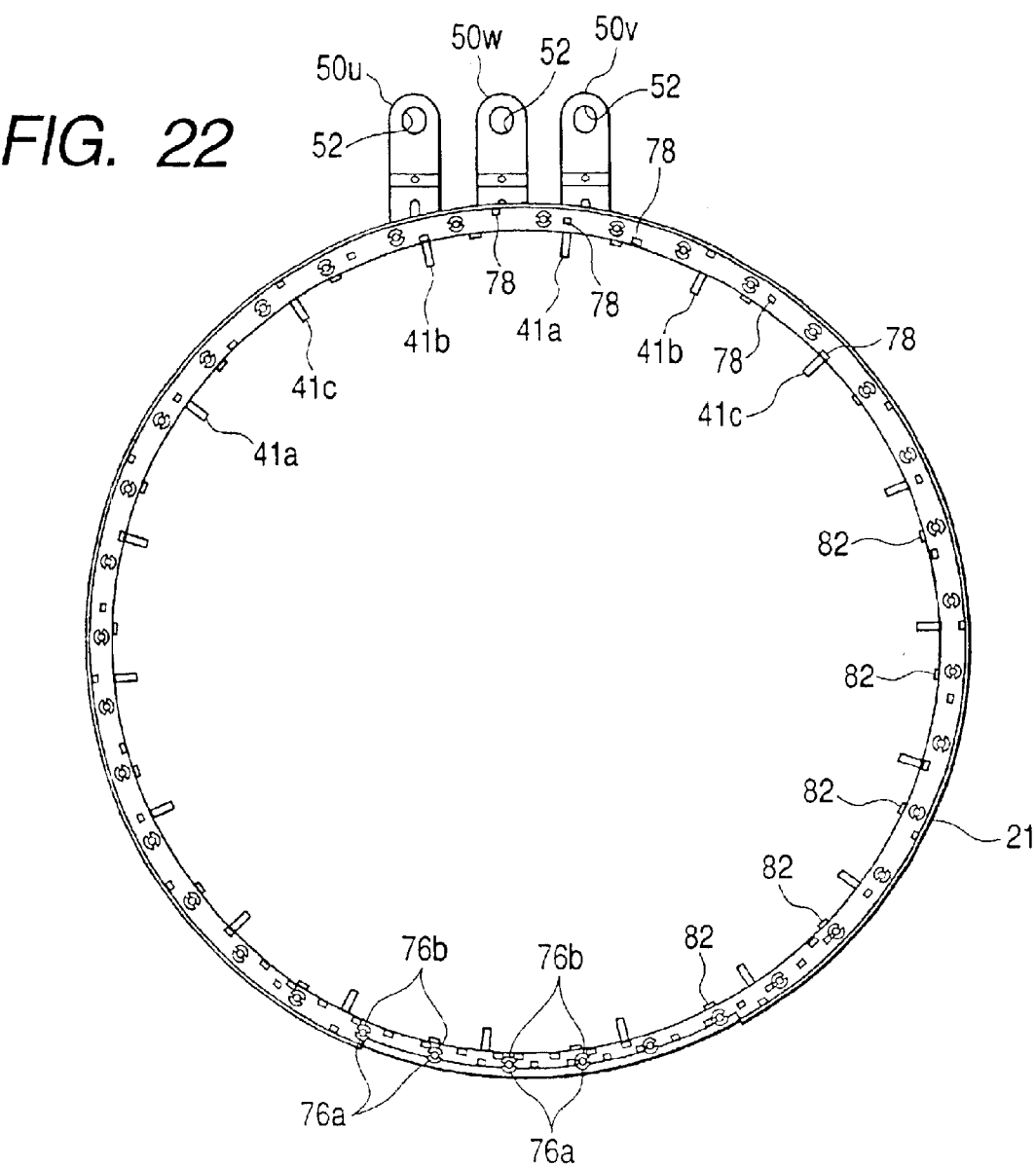
FIG. 22 is a rear elevation view of the insulating holder.
Figure 23A:
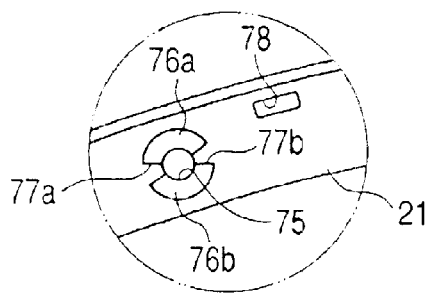
FIG. 23A is an enlarged plan elevation view of a bearing recess.
Figure 23B:
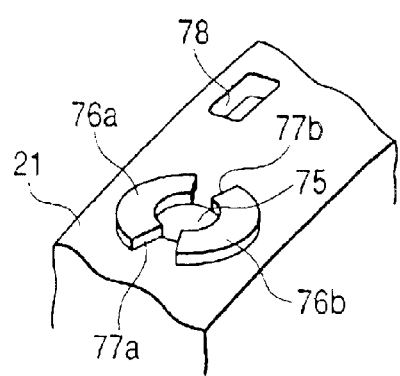
FIG. 23B is an enlarged perspective view of the bearing recess shown in FIG. 23A.

As shown in FIG. 22, and FIGS. 23A and 23B, when the holder support pins 74 move out from the bottom surface of the lower forming recess 71a into the cavity 73, the distal ends of the pins 74 engage bearing recesses 75 in the lower surface of the insulating holder 21. This engagement can prevent displacement of the insulating holder 21 in the radial direction of the cavity 73 when the insulating holder 21 is contained in the cavity 73. The insulating holder 21 is fixed at a proper position in the cavity 73 by the holder support pins 74 and upper mold member supports 80. Consequently, the resin insulation layer 25 is formed around the insulating holder 21 at a uniform thickness.

Each bearing recess 75 has a taper that reduces the recess in diameter toward the inner top part. Thus, the holder support pin 74 finally engages the bearing recess 75 while the pin 74 is being guided along the inner periphery of the bearing recess 75. Accordingly, when the insulating holder 21 is set in the lower forming recess 71a in the lower mold member 71, the holder support pin 74 does not fail to engage the bearing recess 75.

Two arcuate ribs 76a and 76b are formed around the holder support pin 74 on the bottom surface of the insulating holder 21. The ribs 76a and 76b make a virtual depth of the bearing recess 75 larger. This reduces the chance of the holder support pin 74 disengaging from the bearing recess 75 inadvertently and reduces the chance of the insulating holder 21 displacing in the cavity 73.

A plurality of notches 77a and 77b (two notches in the present embodiment) are formed between the ribs 76a and 76b. The formation of the notches 77a and 77b allows the resin for forming the resin insulating layer 25 to easily move toward the bearing recesses 75 via the notches 77a and 77b in the state where the holder support pin 74 is extracted from the bearing recess 75 during the process of insert molding the resin insulation layer 25. In the centralized power distribution unit 17 in the final production step, the bearing recesses 75 are filled with the resin insulation layer 25. The numbers of the ribs 76a and 76b and the notches 77a and 77b can be arbitrarily changed. When the ribs 76a and 76b are formed as one rib having a C-like shape, for example, the notches 77a and 77b can be configured as one notch.

As shown in FIGS. 22, 23, and in FIGS. 14 to 16, the insulating holder 21 is provided, in its bottom surface, with a plurality of communication holes 78 communicating with the holding grooves 23a, 23b, and 23c. The communication holes 78 facilitate the flow of resin for forming the resin insulation layer 25 into the respective holding grooves 23a, 23b, and 23c during insert molding. The plural communication holes 78 are provided on the periphery of the insulating holder 25. In more detail, the respective communication holes 78 are arranged along the holding grooves 23a, 23b, and 23c. In addition, as shown in FIG. 10, the respective communication holes 78 are shifted from each other in the circumferential direction of the insulating holder 21. This means that only one communication hole 78 is disposed on the same line in the radial direction of the insulating holder 21.

Figure 24:
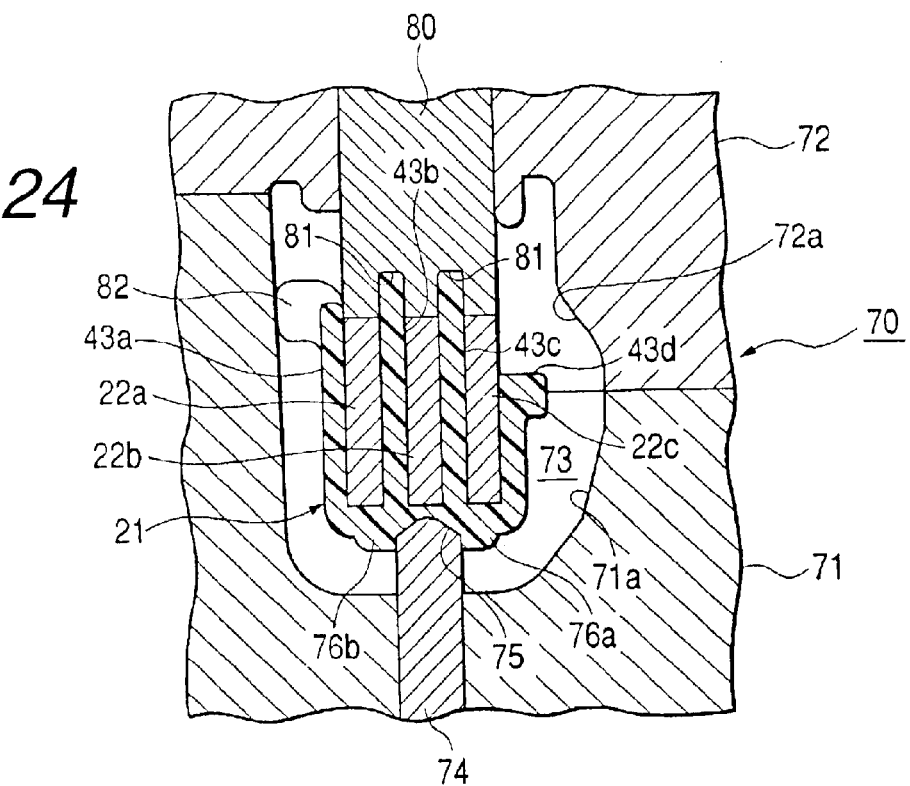
FIG. 24 is a cross sectional view of an insert-molding mold, illustrating the mold in which the insulating holder is set.

As shown in FIGS. 22 and 24, the insulating holder 21 is provided on the inner surface with positioning projections 82 the distal ends of which come into contact with the inner surface of the lower forming recess 71a when the insulating holder 21 is set in the lower mold member 71. The plural positioning projections 82 are arranged at an even spacing in the circumferential direction of the insulating holder 21. When all of the positioning projections 82 come into contact with the inner surface of the lower forming recess 71a, displacement of the insulating holder 21 in its circumferential direction can be substantially eliminated.

Figure 12:
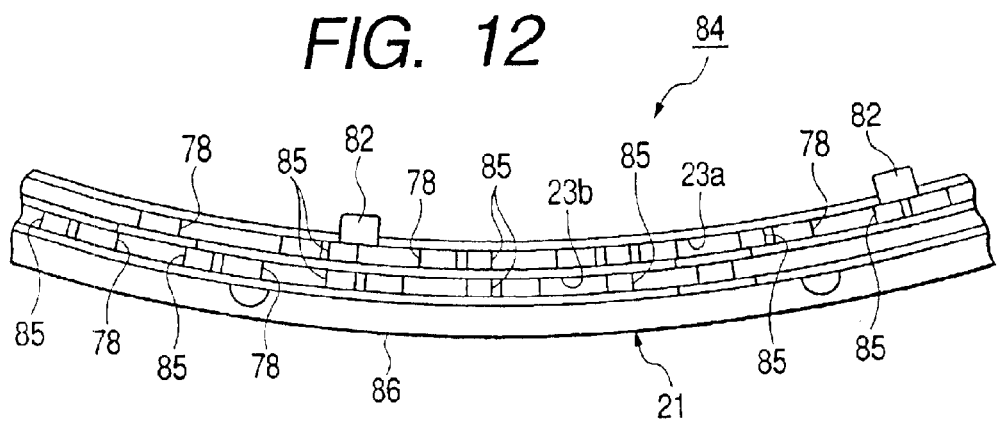
FIG. 12 is an enlarged front elevation view of a part of the insulating holder, illustrating a bus bar non-containing section in the holder.
Figure 13A:
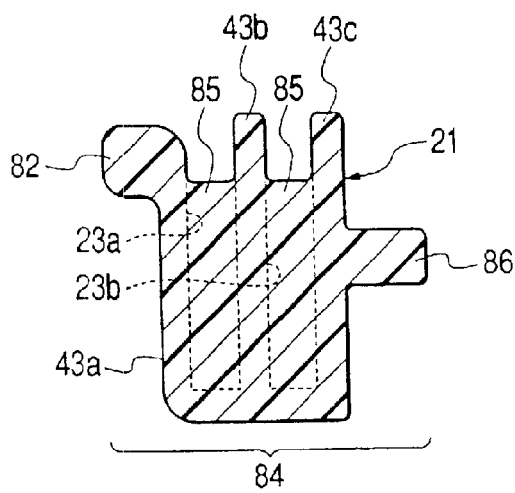
FIG. 13A is a cross sectional view of the insulating holder taken along line 13a—13a in FIG. 9.
Figure 13B:
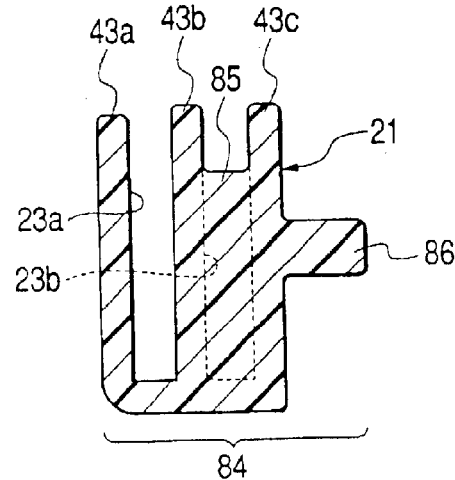
FIG. 13B is a cross sectional view of the insulating holder taken along line 13b—13b in FIG. 9.
Figure 13C:
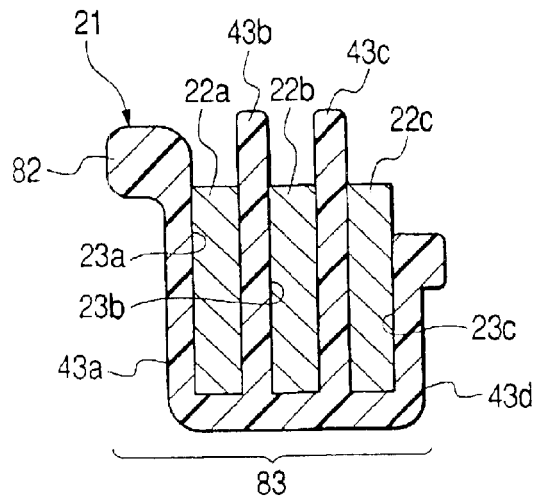
FIG. 13C is a cross sectional view of the insulating holder taken along line 13c—13c in FIG. 9.

As shown in FIGS. 9, 12, and 13, the respective holding grooves 23a to 23c in the insulating holder 21 are divided into a bus bar containing section 83 that accommodates the bus bars 22a to 22c and a bus bar non-containing section 84 that does not accommodate the bus bars. First reinforcement ribs 85 are provided at a given distance in the circumferential direction of the insulating holder 21 on the holding grooves 23a, 23b, and 23c in the bus bar non-containing section 84. The respective first reinforcement ribs 85 are formed integrally together with bottom surfaces and inner side surfaces of the walls 43a to 43d partitioning the respective holding grooves 23a, 23b, and 23c.

The communication holes 78 that serve to facilitate to flow the molten resin material 90 into the respective holding grooves 23a, 23b, and 23c are formed in the bottom surface of the respective holding grooves 23a, 23b, and 23c in the respective sections 83 and 84. Thus, the molten resin material 90 easily flows into the respective holding grooves 23a, 23b, and 23c.

Three holding grooves 23a, 23b, and 23c are provided in the bus bar containing section 83 in the insulating holder 21 while two holding grooves 23a and 23b are provided in the bus bar non-containing section 84 in the insulating holder 21. That is, there is no holding groove 23c at the outermost side in the bus bar non-containing section 84. The bus bar non-containing section 84 in the insulating holder 21 is narrower than the bus bar containing section 83.

Furthermore, the bus bar non-containing section 84 in the insulating holder 21 is provided on the outer periphery with a second reinforcement rib 86 extending in the circumferential direction of the insulating holder 21. The second reinforcement rib 86 is formed into an arcuate shape and a radius of curvature of the rib 86 is set to be the same as the radius of the insulating holder 21.

Next, a process for insert-molding the centralized distribution unit 17 by using the insert-molding mold 70 described above will be explained below.

When the mold 70 is driven to the opened position, the insulating holder 21 is put in the lower forming recess 71a in the lower mold member 71. The holder support pins 74 projecting from the lower forming recess 71a engage the bearing recesses 75 in the insulating holder 21 at the distal ends. Thus, the insulating holder 21 is supported in the lower mold member 71 with the holder 21 being spaced at a certain distance from the bottom surface of the lower forming recess 71a. At this time, the respective plural positioning projections 82 on the insulating holder 21 come into contact with the inner periphery of the lower forming recess 71a at the distal end surfaces. This substantially prevents displacement of the insulating holder 21 in the radial direction.

As shown in FIG. 24, when the upper mold member 72 moves down toward the lower mold member 71 to close the mold 70, the cavity 73 is defined in the mold 70. When the mold 70 is closed, the distal end surfaces of the upper mold member supports 80 projecting from the upper forming recess 72a come into contact with the upper ends of the bus bars 22a, 22b, and 22c. Further, the latch grooves 81 in the distal end surfaces of the upper mold member supports 80 engage the walls 43b and 43c that partition the respective holding grooves 23a, 23b, and 23c. Consequently, the upper mold member supports 80 push the insulating holder 21 and the bus bars 22a, 22b, and 22c. As described above, the insulating holder 21 is constrained from upward and downward movement by the plural holder support pins 74 and plural upper mold member supports 80.

Figure 25:
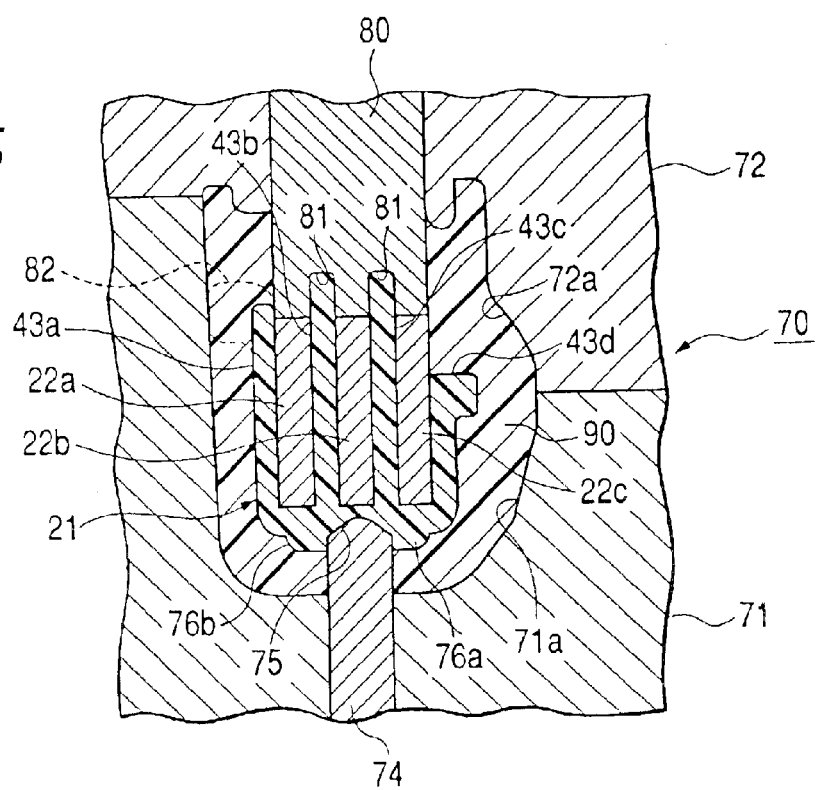
FIG. 25 is a cross sectional view of the insert-molding mold similar to FIG. 24, illustrating the mold into which a molten resin material is poured.

As shown in FIG. 25, molten resin material 90 for forming the resin insulation layer 25 is poured through a gate (not shown) formed in one of the mold members, e.g., the lower mold member 71, into the cavity 73. At this time, the molten resin material 90 that is poured to cover the insulating holder 21 flows through openings of the respective holding grooves 23a, 23b, and 23c into their interiors. In addition, the molten resin material 90 flows through the communication holes 78 in the insulating holder 21 into the holding grooves 23a, 23b, and 23c. Even if the molten resin material 90 is applied under pressure to the holding grooves 23a, 23b, and 23c in the bus bar non-containing section 84 (see FIG. 12) in the insulating holder 21, the first and second reinforcement ribs 85 and 86 prevent or reduce deformation of the walls 43a to 43d.

Figure 26:
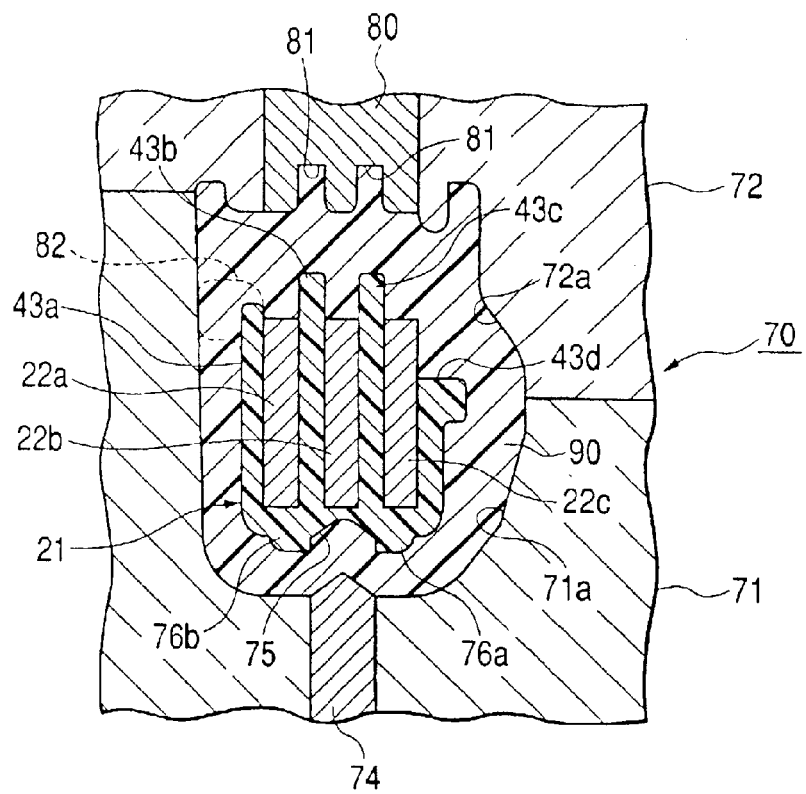
FIG. 26 is a cross sectional view of the insert-molding mold similar to FIG. 25, illustrating the mold in which a holder support pin and an upper mold member support are retracted.

When the molten resin material 90 substantially fills the cavity 73, as shown in FIG. 26, the holder support pins 74 retract into the lower mold member 71 and the upper mold member supports 80 retract into the upper mold member 72. Although the insulating holder 21 is fully floated in the cavity 73 without any supports, the insulating holder 21 will not incline in the cavity 73 since the molten resin material 90 is being poured into the cavity 73. In addition, the molten resin material 90 will fill the holes caused by the retraction of the holder support pins 74 and upper mold member supports 80. Furthermore, the molten resin material 90 flows into the bearing recesses 75 in which the holder support pins have engaged, the spaces around the bearing recesses 75, and the spaces between and around the upper ends of the walls 43b and 43c. Thus, the molten resin material 90 covers the insulating holder 21.

Figure 27:
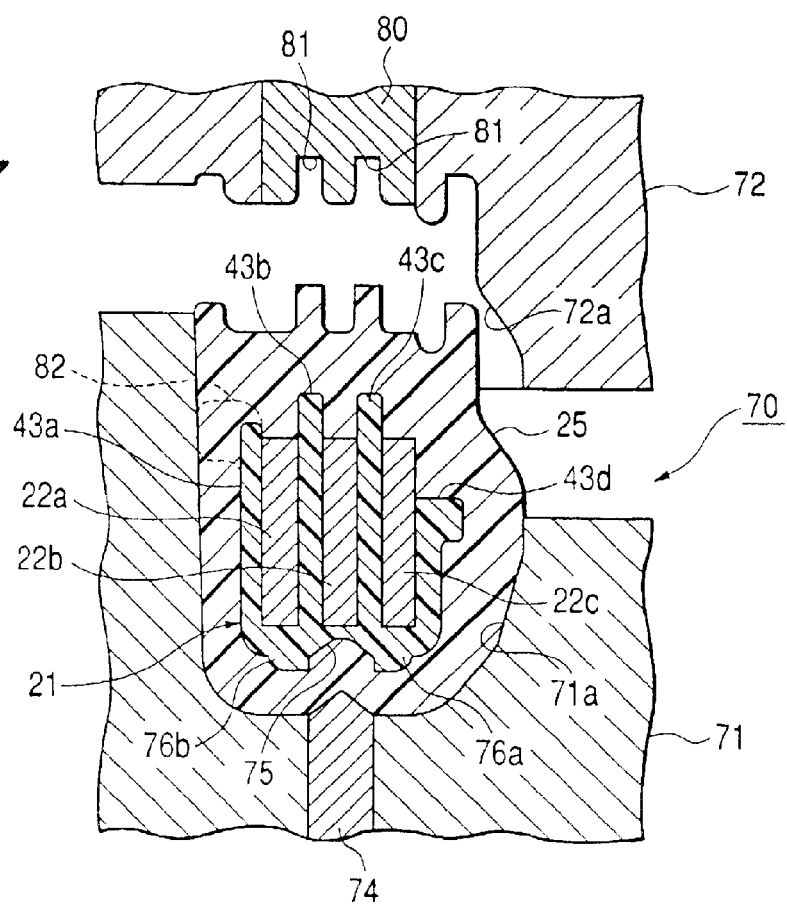
FIG. 27 is a cross sectional view of the insert-molding mold similar to FIG. 26, illustrating the mold in an open position.

As shown in FIG. 27, after a given period of time has passed and the molten resin material 90 has cooled and solidified, the insulation layer 25 is formed. Thereafter, the upper mold member 72 and the lower mold member 71 are separated and placed in the opened position, and the centralized distribution unit 17, in which the insulating holder 21 and the resin insulation layer 25 are integrated together, is removed from the mold 70.

An exemplary process for producing the centralized distribution unit 17 is explained below.

(Step of Punching a Conductive Metallic Plate)

As shown in FIG. 28, in order to form the bus bars 22a, 22b, and 22c for a three-phase motor, three strip-like blanks 92 are formed from one rectangular conductive metal plate 91. In this case, the tabs 41a, 41b, and 41c, and the terminal portions 50u, 50v, and 50w are stamped out in a state where they are coupled to the respective strip-like blanks 92, by a press machine which is not shown.

As shown in FIG. 28, the strip-like blanks 92 which are stamped out from the conductive metal plate 91 are laid out along the longitudinal direction of the conductive metal plate 91 so that they are parallel to one another. The two strip-like blanks 92 which are positioned in the outermost side are placed so that the tabs 41a and 41c and the terminal portions 50v and 50w are directed to the center of the bus bar row. According to the configuration, the three strip-like blanks 92 can be densely laid out (laid out without forming large gaps) in the one conductive metal plate 91. As a result, the unused areas formed among the strip-like blanks 92 are narrowed. Therefore, the amount of wasted material is reduced, and the width of the conductive metal plate 91 which is required for obtaining the strip-like blanks 92 can be shortened.

The three strip-like blanks 92 are formed so as to have an approximately same length. In the one conductive metal plate 91, the strip-like blanks 92 are laid out so that their both ends are substantially aligned with one another.

According to the configuration, in the one conductive metal plate 91, the unused areas formed in the vicinities of the both ends of the three strip-like blanks 92 are narrowed. As a result, the amount of wasted material is reduced, and the length of the conductive metal plate 91 which is required for obtaining the strip-like blanks 92 can be shortened. Among the tabs protruding from each of the strip-like blanks 92, the two tabs which are positioned at endmost portions are formed integrally with the end portions of the strip-like blanks 92, respectively. Therefore, the lengths of the strip-like blanks 92 can be shortened as compared with the case where, for example, a bus bar structure of a complete annular shape is employed. This also contributes to the reduced length of the conductive metal plate 91 which is required for obtaining the strip-like blanks 92.

Figure 29:
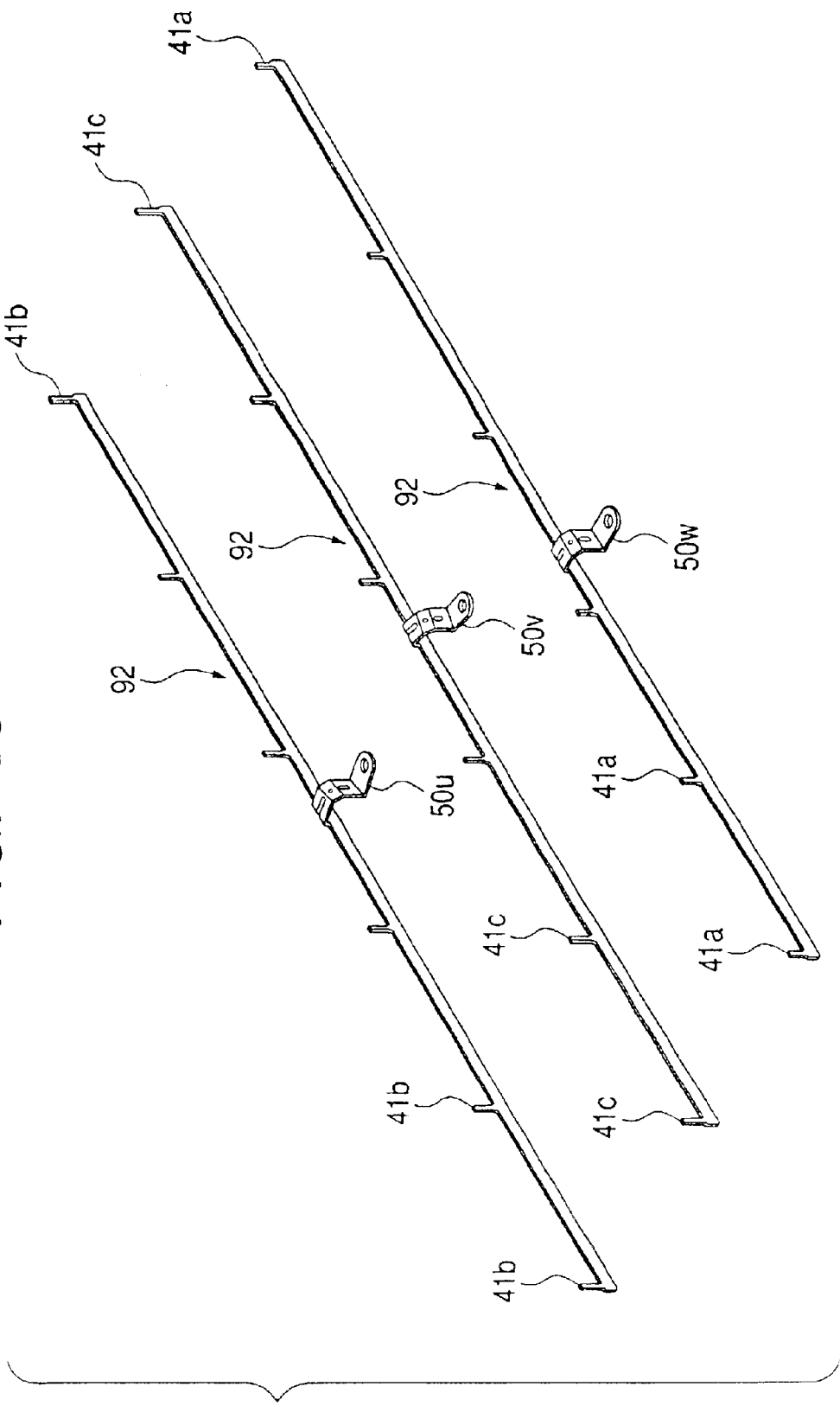
FIG. 29 is a perspective view of the blanks shown in FIG. 28, illustrating the terminal portion of each of bus bars being bent.

In this way, the strip-like blanks 92 are produced from the conductive metal plate 91 before the bending process are applied to the bus bars 22a to 22c. Since the strip-like blanks 92 for forming the bus bars 22a, 22b, and 22c have a substantially linear shape as shown in FIG. 29, they can be stamped out in parallel. This remarkably contributes to a reduced material cost, and to an improved yield as compared with the case where the strip-like blanks 92 are annularly stamped out.

(First Bending of the Bus Bars)

As shown in FIG. 29, the first and second press apparatuses 60 and 61 mentioned above bend the portions corresponding to the terminal portions 50u, 50v, and 50w in the strip-like blanks 92.

(Second Bending of the Bus Bars)

As shown in FIG. 29, the portions corresponding to the bus bars 22a, 22b, and 22c in the strip-like blanks 92 in which the terminal portions 50u, 50v, and 50w have been formed are bent in the thickness direction to form annular shapes. This bending work is carried out by a bending device (not shown). Thus, the bus bars 22a, 22b, and 22c are formed into substantially annular shapes beforehand, before attaching the bus bars 22a, 22b, and 22c to the insulating holder 21.

(Step of Inserting the Bus Bars)

Figure 30:
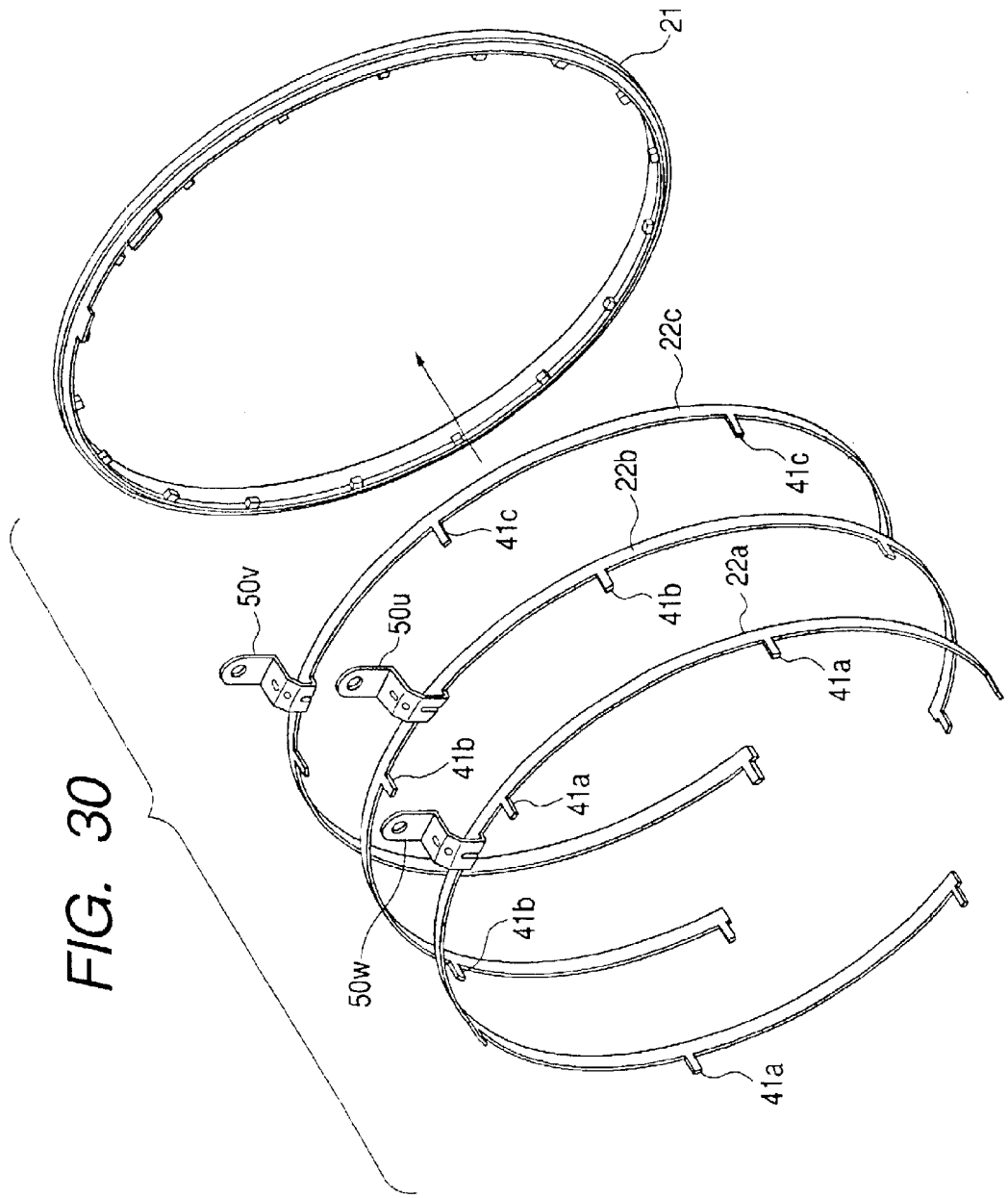
FIG. 30 is a perspective view of ring-like blanks that are formed by bending the blanks shown in FIG. 29, illustrating the bus bars being inserted into the insulating holder.

As shown in FIG. 30, the respective bus bars 22a, 22b, and 22c are inserted into the insulating holder 21 that has already been produced. At this time, the bus bars are inserted into the insulating holder 21 in order from the outermost position to the innermost position. That is, the outside bus bar 22a, intermediate bus bar 22b, and inside bus bar 22c are inserted into the insulating holder 21 in that order. If the inside bus bar 22c is inserted into the insulating holder 21 before inserting the intermediate bus bar 22b, the prior bus bar interferes with entrance of the latter bus bar.

(Third Bending of the Bus Bars)

Figure 31:
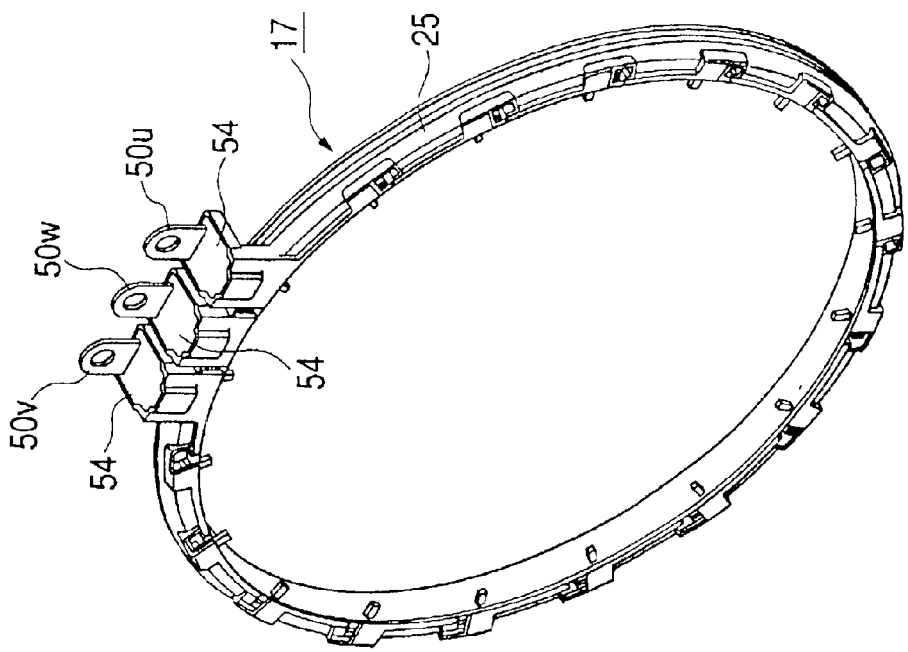
FIG. 31 is a perspective view of the blanks shown in FIG. 30, illustrating tabs of the bus bars being bent inward.

As shown in FIG. 31, the respective tabs 41a, 41b, and 41c are bent so that their distal ends are directed to the center of the insulating holder 21 with the respective bus bars 22a to 22c being attached to the insulating holder 21. The curved portions 44 and 45 are formed on the proximal ends of tabs of the the intermediate bus bar 22b and outside bus bar 22c, respectively.

(Insert Molding)

Figure 32:
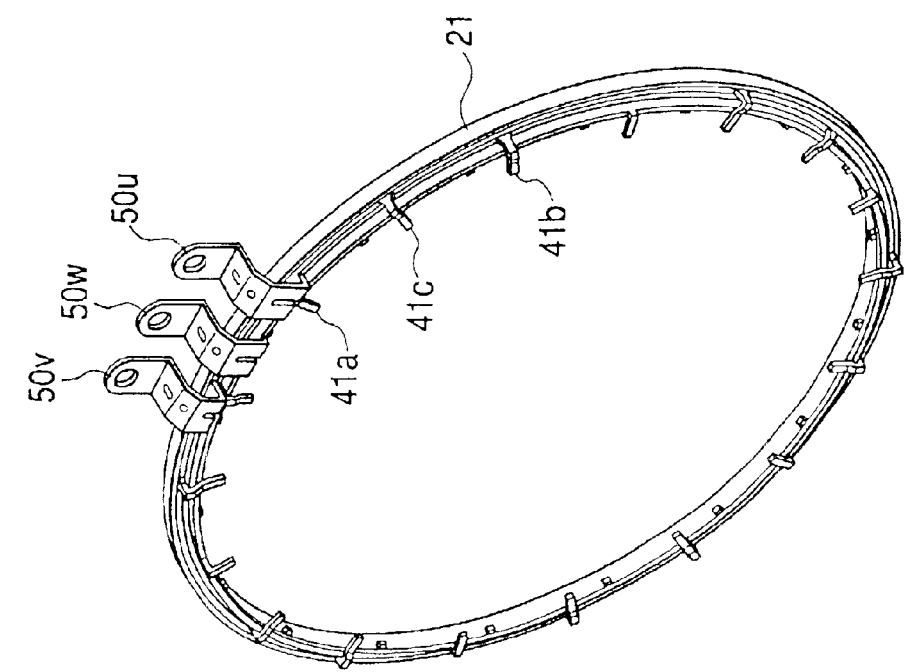
FIG. 32 is a perspective view of the blanks shown in FIG. 31, illustrating a part of the terminal portions being sealed by a sealing material.

As shown in FIG. 32, the resin insulation layer 25 is formed on the outer periphery of the insulating holder 21 to which the bus bars 22a, 22b, and 22c have been already attached. This forming process may be carried out by using the insert-molding mold 70 mentioned above. Thereafter, the centralized distribution unit 17 is taken out from the insert-molding mold 70. Finally, the sealing material 54 fills the resin containing sections 53 (FIG. 5) formed in the resin insulation layer 25.

Accordingly, effects including the following effects may be obtained according to the above-described embodiment.

(1) The bus bars 22a, 22b, and 22c are formed by stamping out into a strip-like shape from the one conductive metal plate 91. In this case, the bus bars 22a, 22b, and 22c are stamped out from the conductive metal plate 91, in the state where the bus bars are densely laid out. Therefore, the required area of the conductive metal plate 91 can be made smaller than that in the case where the bus bars 22a, 22b, and 22c are stamped out into a ring-like shape. Consequently, the material loss is reduced as compared with that in a conventional method, so that the material cost of the bus bars 22a, 22b, and 22c can be lowered. As a result, the centralized power distribution unit 17 can be economically produced.

(2) The bus bars 22a, 22b, and 22c are simultaneously stamped out from the common conductive metal plate 91 by using a mold. In this case, the used area of the conductive metal plate 91 can be reduced to about a half of that in the case where the bus bars 22a, 22b, and 22c are stamped out into a ring-like shape, and the material loss is reliably suppressed. Therefore, the material cost of the bus bars 22a, 22b, and 22c can be reduced. Unlike the conventional art, it is not required to use different molds for respective rings. Therefore, the mold cost can be reduced. As a result, the centralized power distribution unit 17 can be more economically produced.

(3) The tabs 41a, 41b, and 41c, and the terminal portions 50w, 50w, and 50v are integrally formed, coupled with the bodies of the bus bars 22a, 22b, and 22c, respectively. In this case, it is not necessary to attach the tabs 41a, 41b, and 41c, and the terminal portions 50w, 50w, and 50v in a subsequent step by welding or the like. Therefore, the number of steps of producing the bus bars 22a, 22b, and 22c can be reduced. As a result, the centralized power distribution unit 17 can be more economically produced.

(4) The bus bars 22a, 22b, and 22c are stamped out from the conductive metal plate 91 in the state where both ends of the bus bars are substantially aligned with one another, and in the state where the bus bars are placed in parallel. In the conductive metal plate 91, therefore, material loss in the areas of the ends in the longitudinal direction and the sides in the width direction of the bus bars 22a, 22b, and 22c is reduced. Consequently, the material cost of the bus bars 22a, 22b, and 22c can be further lowered, so that the centralized power distribution unit 17 can be still more economically produced.

(5) Among the bus bars 22a, 22b, and 22c, the bus bars 22a and 22c which are positioned in the outermost side are laid out in parallel so that the terminal portions 50w and 50v and the tabs 41a and 41c are directed to the center of the bus bar row. According to this configuration, in the conductive metal plate 91, the material loss in the areas of the ends in the longitudinal direction of the bus bars 22a, 22b, and 22c is reduced. Consequently, the material cost of the bus bars 22a, 22b, and 22c can be further lowered. As a result, the centralized power distribution unit 17 can be still more economically produced.

The above-described embodiment of the invention may be modified in, for example, the following ways.

Figure 33:
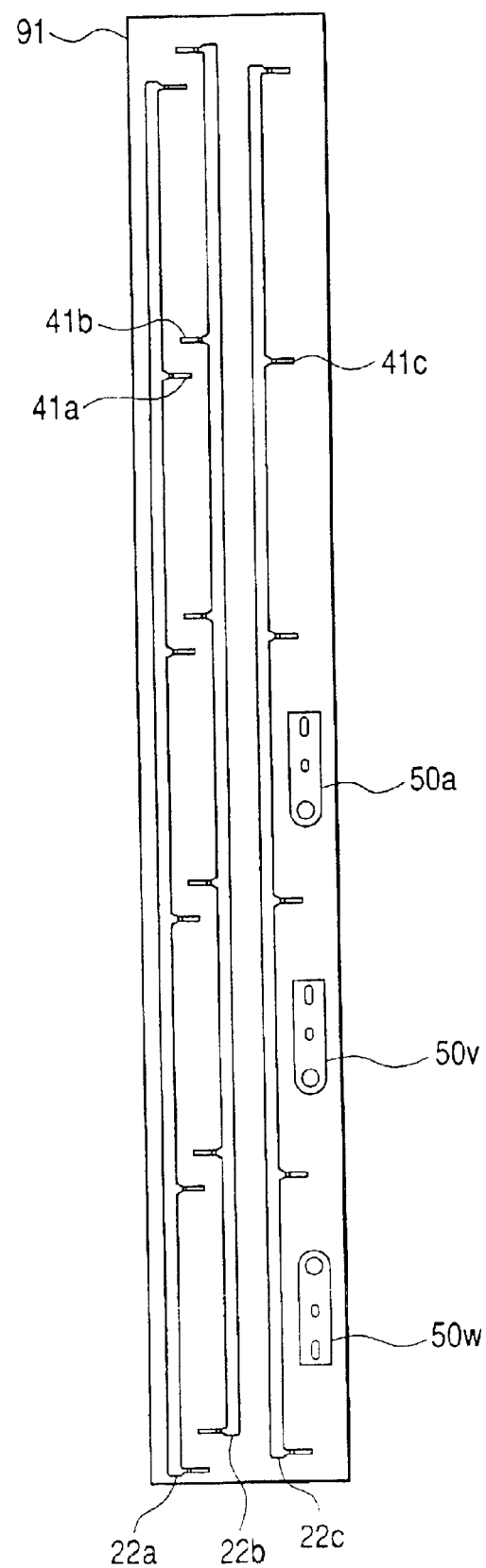
FIG. 33 is a view showing another example of a process of stamping out strip-like molded materials from a conductive metal plate.
Figure 34A:
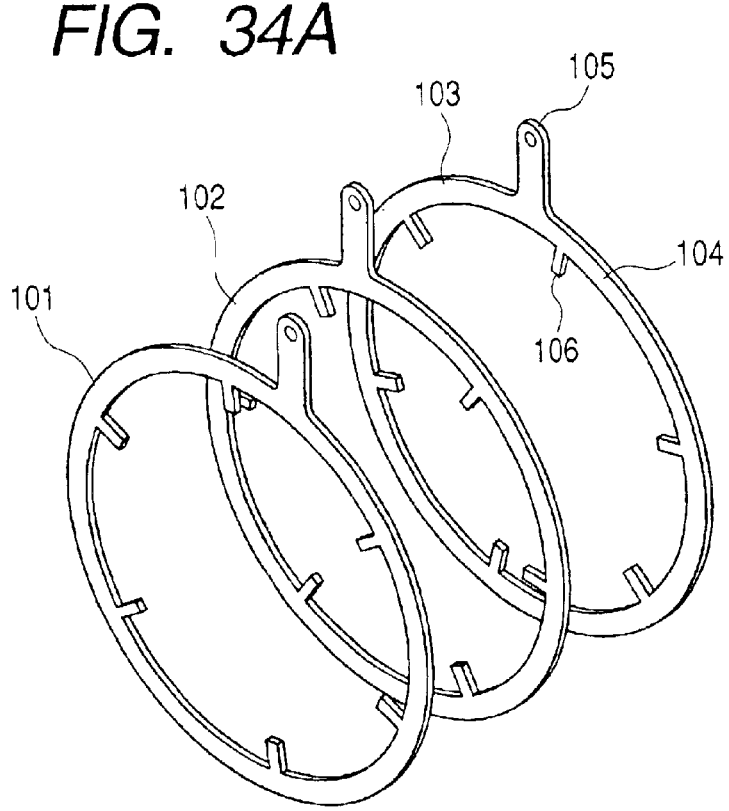
FIG. 34A is a perspective view of conventional ring-like bus bars.
Figure 34B:
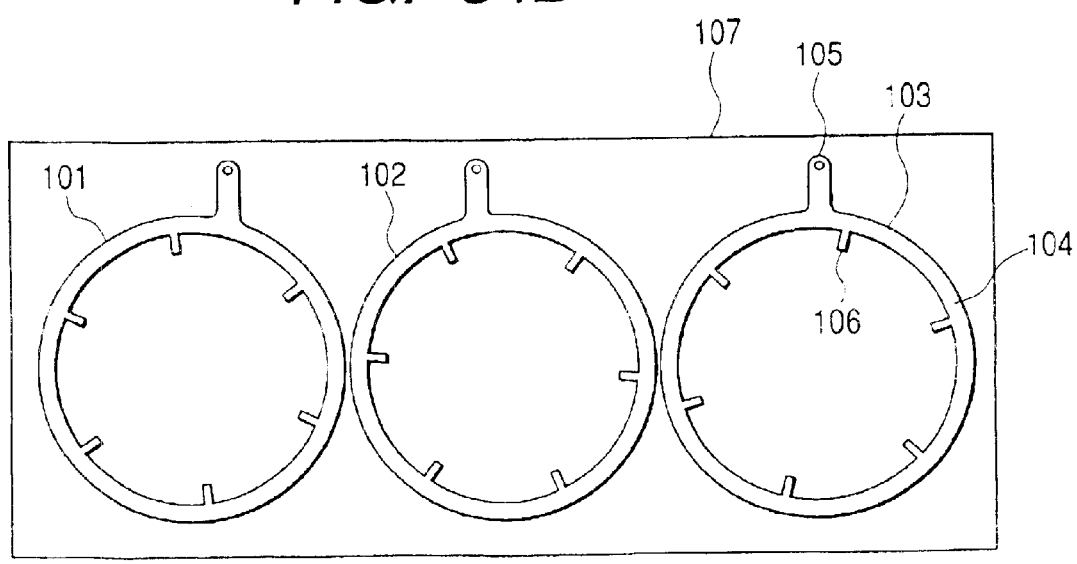
FIG. 34B is a plan view of a conductive metallic plate from which the conventional ring-like bus bars are to be punched out.

In the above-described embodiment, the terminal portions 50w, 50u, and 50v, and the tabs 41a, 41b, and 41c are formed integrally with the bodies of the bus bars 22a, 22b, and 22c, respectively. Alternatively, the terminal portions 50w, 50u, and 50v, and/or the tabs 41a, 41b, and 41c may be formed by stamping as members separated from the bodies of the bus bars 22a, 22b, and 22c. For example, as shown in FIG. 33, the bus bars 22a, 22b, and 22c are laid out in parallel. The terminal portions 50u, 50v, and 50w are laid out in parallel with the bodies of the bus bars 22a, 22b, and 22c, between the tabs 41a, 41b, and 41c disposed on the bodies of the bus bars 22a, 22b, and 22c. According to the configuration, the bus bars 22a, 22b, and 22c can be placed more densely, and hence the amount of wasted material in the width direction of the conductive metal plate 91 is further reduced. Therefore, the area of the conductive metal plate 91 which is required for stamping out the bus bars 22a, 22b, and 22c can be made smaller than that in the above-described embodiment. In this case, the terminal portions 50w, 50u, and 50v, and the tabs 41a, 41b, and 41c are later attached to the bodies of the bus bars 22a, 22b, and 22c. As a method of conducting the later attachment, specifically, welding, brazing, soldering, screw fixation, or the like may be used.

In the above-described embodiment, the terminal portion 50w, 50u, or 50v, and the tabs 41a, 41b, or 41c are formed on the same side edge of the corresponding one of the bus bars 22a, 22b, and 22c. Alternatively, the terminal portion 50w, 50u, or 50v, and the tabs 41a, 41b, or 41c may be formed on different side edges.

In the above-described embodiment, the invention is applied to the centralized power distribution unit 17 for the three-phase thin DC brushless motor 11. The invention is not limited to this, and may be applied to a centralized power distribution unit for a motor in which the phase number is larger than three (or smaller than three). In accordance with the phase number, the numbers of the bus bars and the holding grooves may be increased or decreased.

In this case, for example, four bus bars for a four-phase motor may be stamped out from a common conductive metal plate 91, or five bus bars for a five-phase motor may be stamped out from a common conductive metal plate 91.

In addition to the technical concepts explicitly described above, several technical concepts can be grasped from the embodiment described above. The technical concepts will be described together with their effects.

(1) In a method of producing bus bars used in a centralized power distribution unit, the terminal portion and the tabs are formed on a same side edge of the bus bar body. According to the configuration, the stamping can be performed so that the terminal portion and the tabs of one(s) of the bus bars which are positioned in the outermost side among the bus bars which are placed in parallel are directed to the center of the bus bar row. Therefore, the material loss in the process of stamping out the bus bars from the conductive metal plate can be reduced, so that the centralized power distribution unit for a vehicular thin brushless motor can be produced at a low cost.

As described above in detail, according to the invention, it is possible to provide a centralized power distribution unit for a vehicular thin brushless motor which can be produced in a relatively simple manner, and which has high reliability.

According to the invention, the material cost of the bus bars, and the mold cost can be reduced, and hence the centralized power distribution unit for a vehicular thin brushless motor can be produced at a low cost.

According to the invention, the number of steps of producing the bus bars can be reduced, and hence the centralized power distribution unit for a vehicular thin brushless motor can be produced at a low cost.

According to the invention, the loss of the metal material for producing the bus bars can be further reduced, and hence the centralized power distribution unit for a vehicular thin brushless motor can be produced at a lower cost.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

The entire disclosure of Japanese Patent Application No. 2001-330026 filed on Oct. 26, 2001 including the specification, claims, drawings and summary is incorporated herein by reference in its entirety.

What is claimed is:

1. A centralized power distribution unit for a vehicular thin brushless motor, wherein said centralized power distribution unit is formed into a ring configuration and can concentratedly distribute current to stator windings of the motor, comprising:

a plurality of bus bars each having a terminal portion to be connected to a power source and one or more tabs to be connected respectively to one or more of the stator windings, the bus bars provided correspondingly with phases of the motor; and a resin insulating layer that covers the bus bars, wherein each of the bus bars comprises a metal strip that is bent, in a thickness direction of the metal strip, into a substantially annular shape, and diameters of the annular shapes of the bus bars are set to be different from one another depending on the corresponding motor phase, the bus bars are stacked in a radial direction of the centralized power distribution unit, mutually separated by a predetermined gap, and at least one of the terminal portions includes a first section extending in a first direction that is a substantially radial direction of the centralized power distribution unit, a second section extending in a second direction substantially perpendicular to the first direction, and a ramp section connecting the first and second sections and extending in a third direction that is different from the first and second directions.

2. The centralized power distribution unit according to claim 1, wherein at least one slit is provided in at least one of the terminal portions.

3. The centralized power distribution unit according to claim 2, wherein a section of the at least one of the terminal portions is covered by a sealing material, and the at least one slit is provided in the section covered by the sealing material.

4. The centralized power distribution unit according to claim 2, wherein the at least one slit extends in a longitudinal direction of the terminal portion.

* * * * *